(12) United States Patent
Vamanan et al.

(10) Patent No.: US 12,108,274 B2
(45) Date of Patent: Oct. 1, 2024

(54) SYSTEMS AND METHODS FOR CONFIGURING COMMUNICATION WITH AN IAB MEC

(71) Applicant: APPLE INC., Cupertino, CA (US)

(72) Inventors: Sudeep Manithara Vamanan, Bavaria-Bayern (DE); Sarma V. Vangala, Cupertino, CA (US); Fangli Xu, Beijing (CN); Haijing Hu, Cupertino, CA (US); Krisztian Kiss, Cupertino, CA (US); Mona Agnel, Greater London (GB); Naveen Kumar R Palle Venkata, San Diego, CA (US); Ralf Rossbach, Bavaria-Bayern (DE); Sethuraman Gurumoorthy, Cupertino, CA (US); Yuqin Chen, Beijing (CN); Zhibin Wu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,297

(22) PCT Filed: Jun. 28, 2021

(86) PCT No.: PCT/CN2021/102826
§ 371 (c)(1),
(2) Date: Sep. 15, 2021

(87) PCT Pub. No.: WO2023/272448
PCT Pub. Date: Jan. 5, 2023

(65) Prior Publication Data
US 2024/0040427 A1 Feb. 1, 2024

(51) Int. Cl.
*H04W 28/02* (2009.01)
*H04L 41/08* (2022.01)
*H04W 76/14* (2018.01)

(52) U.S. Cl.
CPC ......... *H04W 28/0268* (2013.01); *H04L 41/08* (2013.01); *H04W 76/14* (2018.02)

(58) Field of Classification Search
CPC .... H04W 28/0268; H04W 76/14; H04L 41/08
See application file for complete search history.

(56) References Cited

U.S. PATENT DOCUMENTS

2019/0306251 A1* 10/2019 Talebi Fard .......... H04W 76/10
2021/0084107 A1*  3/2021 Lu ..................... H04M 15/8038
(Continued)

FOREIGN PATENT DOCUMENTS

CN           110475368 A       11/2019

OTHER PUBLICATIONS

PCT/CN2021/102826, International Search Report and Written Opinion, Mar. 1, 2022, 9 pages.

*Primary Examiner* — Chi Ho A Lee
(74) *Attorney, Agent, or Firm* — Dorsey & Whitney LLP

(57) ABSTRACT

Systems and methods are disclosed herein for using integrated access and backhaul (IAB) nodes configured to provide multi-access edge computing (MEC) functionality. An IAB node may include a MEC functionality that includes an instance of an application configured for MEC. A UE using the application connects to the network through an access link with the IAB node and establishes a PDU session for traffic of the application with a core network (CN). The CN may determine that the traffic corresponds to the application, and that an instance of the application is present on the IAB node. Accordingly, the CN may instruct the IAB donor to instantiate a remote packet data convergence protocol (PDCP) layer and, in some cases, a remote service data application (SDAP) layer that are configured to route the traffic from the UE for the application to the instance of the application on the IAB node.

20 Claims, 17 Drawing Sheets

(56) References Cited

U.S. PATENT DOCUMENTS

| | | | |
|---|---|---|---|
| 2021/0127319 A1 | 4/2021 | Huang et al. | |
| 2021/0168646 A1 | 6/2021 | Chen et al. | |
| 2021/0219204 A1* | 7/2021 | Shi | H04W 36/22 |
| 2021/0392540 A1* | 12/2021 | Chong | H04W 28/0268 |
| 2022/0078857 A1* | 3/2022 | Kim | H04W 76/10 |
| 2022/0346190 A1* | 10/2022 | Zhu | H04W 80/10 |
| 2022/0394113 A1* | 12/2022 | Akl | H04W 76/14 |
| 2023/0016871 A1* | 1/2023 | Fujishiro | H04W 40/22 |
| 2023/0084094 A1* | 3/2023 | Youn | H04W 36/14 |
| | | | 370/331 |
| 2023/0104162 A1* | 4/2023 | Hallenstål | H04W 76/22 |
| | | | 370/328 |
| 2023/0189091 A1* | 6/2023 | Zhuo | H04W 72/0446 |
| | | | 370/331 |
| 2023/0269630 A1* | 8/2023 | Teyeb | H04W 36/0009 |
| | | | 370/331 |

* cited by examiner

SYSTEMS AND METHODS FOR CONFIGURING COMMUNICATION WITH AN IAB MEC

TECHNICAL FIELD

This application relates generally to wireless communication systems, including systems and methods for using integrated access and backhaul (IAB) nodes configured to provide multi-access edge computing (MEC) functionality at the IAB node.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®)).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

A millimeter wave (mmWave) deployment of a wireless network may use fiber backhaul in order to carry traffic at NR speeds. It may be difficult or expensive, however, to provide fiber backhaul for the many nodes used for mmWave coverage. In certain systems, integrated access and backhaul (IAB) may be used to overcome deployment costs of ultradense NR mmWave networks by realizing wireless backhaul links to relay the access traffic.

IAB architectures enable multi-hop routing wherein each of a hierarchy of IAB nodes serve as both access nodes to UEs and provide wireless backhaul links to other IAB nodes and/or an IAB donor that is connected to a CN. On the wireless backhauls, a backhaul adaptation protocol (BAP) layer may enable routing over multiple hops through the system. The BAP allows for the IAB nodes and/or the IAB donor to communicate with each other and provides for a number of functionalities which include, for example, mapping of next hop radio link control (RLC) channels, routing to next hop IAB nodes/the IAB donor based on traffic differentiation, indication of network events (e.g., radio link failure (RLF)), data transfer, and/or flow control feedback signaling, etc.

Figure 1:
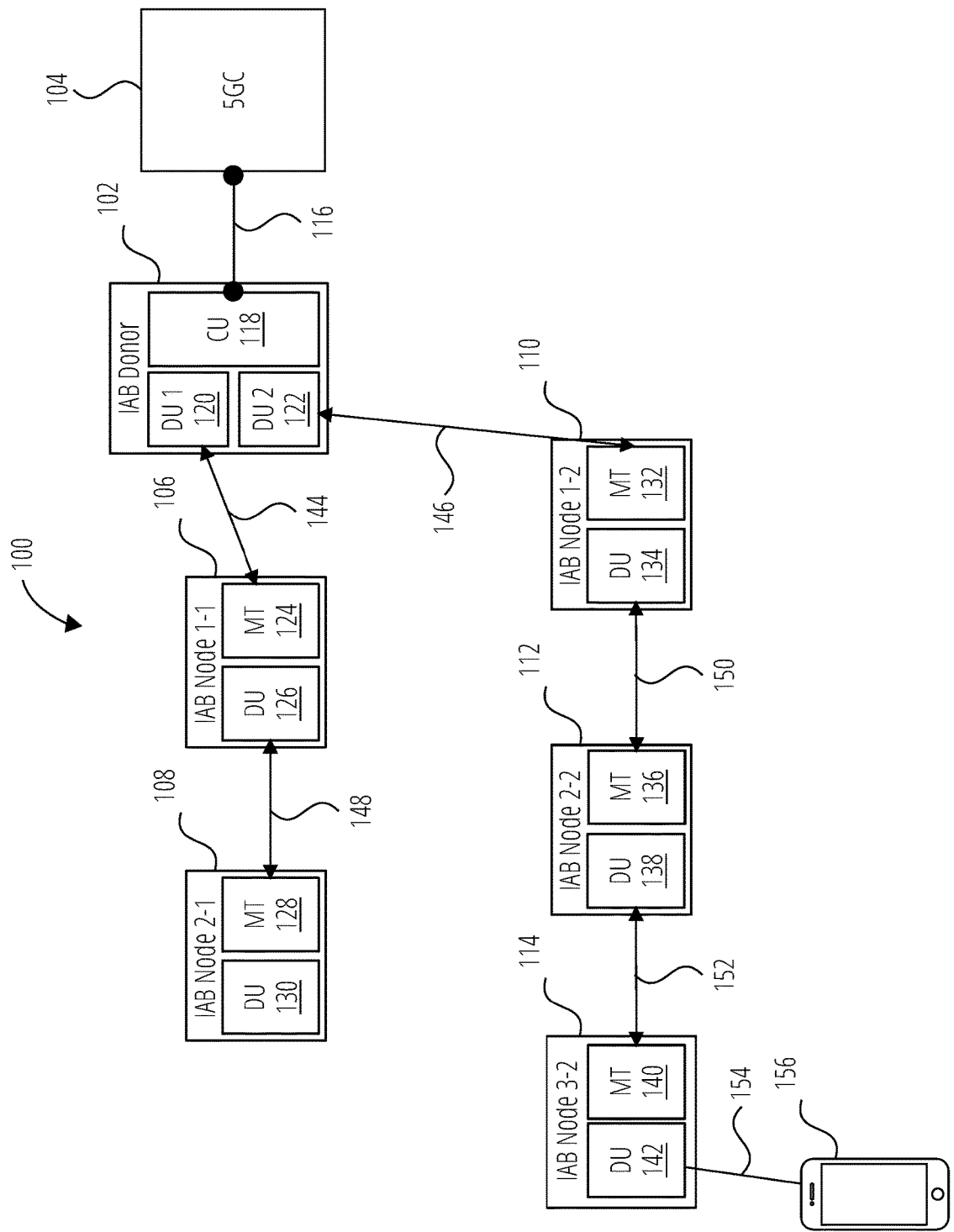
FIG. 1 illustrates an IAB network according to an embodiment.

FIG. 1 illustrates an IAB network 100 according to an embodiment. The IAB network 100 includes an IAB donor 102 that is communicatively connected with a 5GC 104 via a fiber backhaul 116. This connection may comprise an NG interface.

The IAB donor 102 includes a control unit (CU) 118 one or more distributed units (DU) (e.g., the DU 1 120, and the DU 2 122).

The IAB network 100 further includes an IAB node 106 (shown as IAB Node 1-1), an IAB node 108 (shown as IAB Node 2-1), an IAB node 110 (shown as IAB Node 1-2), an IAB node 112 (shown as IAB Node 2-2), and an IAB node 114 (shown as IAB Node 2-3). An IAB node may include a mobile termination functionality (MT) and a DU. As illustrated in FIG. 1, the IAB node 106 includes the MT 124 and the DU 126, the IAB node 108 includes the MT 128 and the DU 130, the IAB node 110 includes the MT 132 and the DU 134, the IAB node 112 includes the MT 136 and the DU 138, and the IAB node 114 includes the MT 140 and the DU 142.

Within the IAB network 100, the IAB nodes 106 through 114 and the IAB donor 102 may connect to other(s) of the IAB nodes 106 through 114 and/or the IAB donor 102, via one or more wireless backhauls between a DU and an MT. For example, the IAB donor 102 and the IAB node 106 are connected via a first wireless backhaul 144 between the DU 1 120 of the IAB donor 102 and the MT 124 of the IAB node 106, and the IAB donor 102 and the IAB node 110 are connected via a second wireless backhaul 146 between the DU 2 122 of the IAB donor 102 and the MT 132 of the IAB node 110. The IAB node 106 and the IAB node 108 are connected via a third wireless backhaul 148 between the DU 126 of the IAB node 106 and the MT 128 of the IAB node 108. The IAB node 110 and the IAB node 112 are connected via a fourth wireless backhaul 150 between the DU 134 of the IAB node 110 and the MT 136 of the IAB node 112. The IAB node 112 and the IAB node 114 are connected via a fifth wireless backhaul 152 between the DU 138 of the IAB node 112 and the MT 140 of the IAB node 114.

Finally, the IAB network 100 includes the UE 156, which is connected to the DU 142 of the IAB node 114. The DU 142 may provide the access link 154 to make this connection. Accordingly, the UE 156 is functional with the 5GC 104 via a communication relay through the IAB node 114, the IAB node 112, the IAB node 110, and the IAB donor 102. Skilled persons will recognize from the disclosure herein that any of the IAB nodes 106 through 114 and/or the IAB donor 102 may also provide access to one or more other UEs via an access link with a respective DU.

The CU 118 of the IAB donor 102 may provide for basic control plane functionality throughout the IAB network 100. In certain embodiments, the CU 118 of the IAB donor 102 includes CU-control plane (CU-CP), CU-user plane (CU-UP), and/or other functionality.

A DU (e.g., DU 1 120, the DU 2 122, the DU 126, the DU 130, the DU 134, the DU 138, and/or the DU 142) may be configured to communicate with other entities within the IAB network 100 (e.g., with a child IAB node via a wireless backhaul, and/or with one or more UE over an access link, in the manner described.

An MT of an IAB node (e.g., the MT 124 of the 106, the MT 128 of the IAB node 108, the MT 132 of the IAB node 110, the MT 136 of the IAB node 112, and/or the MT 140 of the IAB node 114) comprises components that configure an IAB node to behave similar to a regular UE. For example, protocols that typical UEs use to connect to a RAN are supported in the MT with additional enhancements discussed in 3GPP Rel. 16 and Rel.17. For example, an MT in an IAB node allows the IAB node to establish signaling radio bearers (SRBs) and/or data radio bearers (DRBs) with its parent node. An MT may further perform cell selection to identify which parent entity to join and sets up and utilizes one or more protocol layers (e.g., including a BAP layer) that provide functionality for routing data for different UE bearers over different routes through the network.

IAB nodes 106 through 114 may each act as a "parent" and/or a "child" to one or more other of the IAB nodes 106 through 114 to which it is connected. An IAB node that is closer on a route (in number of hops over wireless backhauls) to the IAB donor 102 than another IAB node to which it is connected may be considered a "parent" node of the other IAB node. For example, in FIG. 1, the IAB node 106 is a parent node of the IAB node 108. An IAB node that is further on a route (in number of hops over wireless backhauls) from the IAB donor 102 than another IAB node to which it is connected may be considered a "child" node of that the other IAB node. For example, the IAB node 112 is a child node of the IAB node 110. In similar fashion, the IAB donor 102 may be understood to be the parent node of the IAB node 106 and the IAB node 110 (which are each child nodes of the IAB donor 102).

The use of the IAB donor 102 and one or more of the IAB nodes 106 through 114 may promote better overall coverage for UE in the geographical area covered by the IAB network 100 as opposed to using a single transmission reception point in a geographical area. For example, in a developed area, the use of the IAB nodes 106 through 114 may promote line of sight (LoS) coverage around corners. Further, the location of the IAB nodes 106 through 114 away from the IAB donor 102 may increase the coverage range for the IAB network 100 generally.

Figure 2:
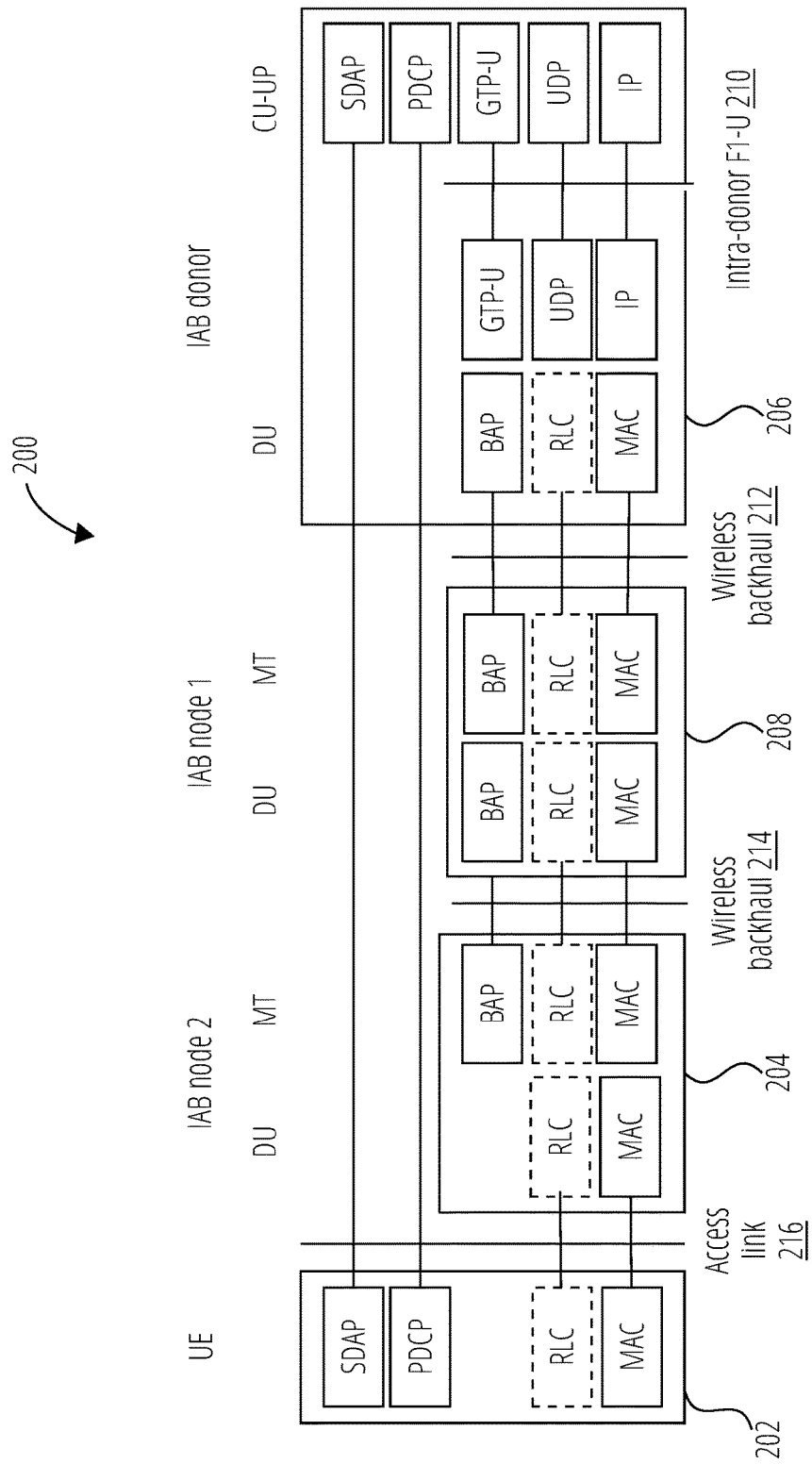
FIG. 2 illustrates a user plane protocol architecture for IAB according to an embodiment.

FIG. 2 illustrates a user plane protocol architecture for IAB 200 according to an embodiment. The user plane protocol architecture for IAB 200 shows various protocol layers for a UE 202, a first IAB node 208 (IAB node 1), a second IAB node 204 (IAB node 2), and an IAB donor 206. The various layers may correspond to MT, DU, or CU-UP entities, as illustrated. The DU and CU-UP of the IAB donor 206 may communicate through an intra-donor F1-U interface 210. In this example, the UE 202 wirelessly communicates with the second IAB node 204 through a dedicated DRB on an access link 216, the second IAB node 204 wirelessly relays the uplink traffic to the first IAB node 208 via a first wireless backhaul 214, and the first IAB node 208 wirelessly relays the uplink traffic to the IAB donor 206 via a second wireless backhaul 212. The protocol layers include, for example, medium access control (MAC), RLC, packet data convergence protocol (PDCP), service data adaptation protocol (SDAP), internet protocol (IP), user datagram protocol (UDP), and general packet radio service (GPRS) tunneling protocol user plane (GTP-U).

The user plane protocol architecture for IAB 200 also includes a BAP layer that provides functionality for routing data for different UE bearers over different routes through the network. This may be done by having an adaptation layer header that includes some information to identify a bearer. The routing includes mapping incoming data to an outgoing link based on the bearer identifier.

Figure 3:
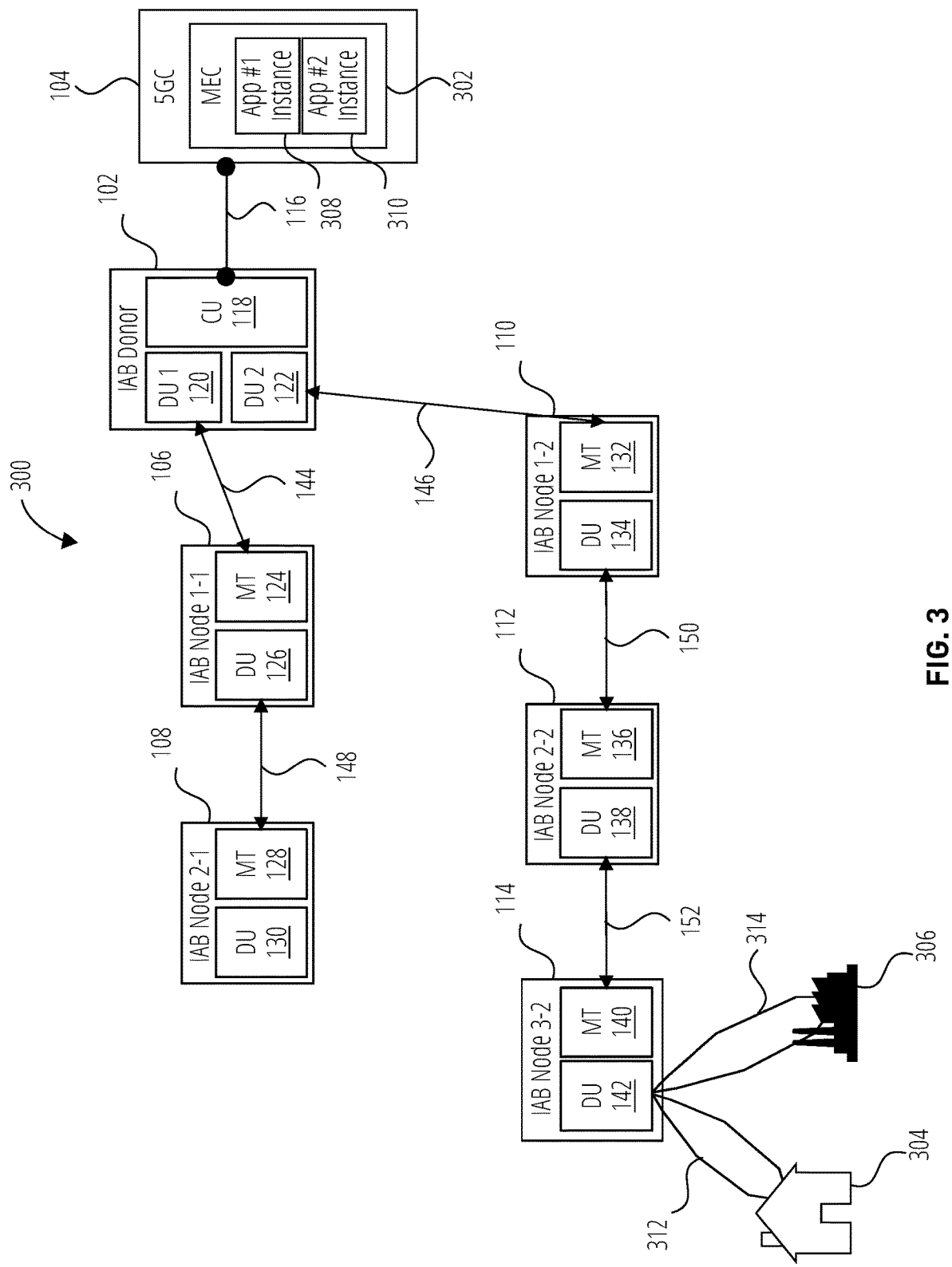
FIG. 3 illustrates an IAB network according to an embodiment.

FIG. 3 illustrates an IAB network 300 according to an embodiment. The IAB network 300 may include the IAB donor 102, the 5GC 104, the IAB node 106, the IAB node 108, the IAB node 110, the IAB node 112, and the IAB node 114 of FIG. 1 (along with their component parts and connections to each other, in the manner described in FIG. 1).

In the embodiment of FIG. 3, the 5GC 104 may include a multi-access edge computing (MEC) functionality 302. The MEC functionality 302 may provide one or more instances of one or more a network-communication-dependent application(s) (e.g., the application #1 instance 308 and the application #2 instance 310, though fewer or more than these may be provided in alternative embodiments) used by UE(s) of the IAB network 300. Each of the application #1 instance 308 and the application #2 instance 310 may each communicate with UE of the IAB network 300 via a user plane function (UPF) of the 5GC 104. According to the MEC functionality 302, once established, the each of the application #1 instance 308 and/or the application #2 instance 310 may be updated by and/or send updates to other, external instances of that application (e.g., out through the 5GC 104 and over the internet), to keep the various instances of the application consistent on a scale beyond the IAB network 100. Then, due to the proximity of the application #1 instance 308/application #2 instance 310 (within the MEC functionality 302 of the 5GC 104), the respective application(s) may operate with a UE of the IAB network 300 more quickly than a case where the instance of the application with which the UE communicates is instead available only beyond the 5GC 104 (e.g., via the internet). This speedup may be due to a reduced latency from information not traveling as "far" (e.g., through the relevant hops of the IAB network 300 back to the 5GC 104).

Further, the IAB network 300 includes a first non-public network (NPN)/stand-alone non-public network (SNPN) 304 and a second NPN/SNPN 306. Each of these may include one or more UE (not illustrated) that are configured for private communications according to the configuration of the respective NPN/SNPN. The UE of the first NPN/SNPN 304 are connected to the DU 142 of the IAB node 114 via the first plurality of access links 312, and the UE of the second NPN/SNPN 306 are connected to the DU 142 of the IAB node 114 via the second plurality of access links 314.

The use of NPN/SNPN may allow for better management of networks and the ability to build private networks using additional features like network slicing. For example, it may be that the application #1 instance 308 is configured to serve UE of the first NPN/SNPN 304 on a first network slice, and that the application #2 instance 310 is configured to serve UE of the second NPN/SNPN 306 on a second network slice.

In some instances, the network slicing according to application and NPN/SNPN may be intended to enable transmissions for the respective application through the IAB network 300 to meet certain quality of service (QoS) requirements. For example, it may be that an application is configured to use ultra-reliable low-latency communications (URLLC) with its UEs, meaning that, for example, that data of the application is delivered between a UE of the respective NPN/SNPN and a 5GC within a certain amount of time and/or with a certain reliability.

It may be, however, that these QoS requirements for the application(s) cannot be guaranteed in the IAB network 300 (even when the related application #1 instance 308 and/or the application #2 instance 310 are located in the 5GC 104 according to the MEC functionality 302). This may be because of the IAB nature of the IAB network 300. For example, the number of hops from the IAB node 114 back to the IAB donor 102 and to the 5GC 104 (which includes the application #1 instance 308 and the application #2 instance 310) may introduce latency to the extent that the QoS requirements for the application data are not met. Further note that in at least some networks, there is no upper limit on the number IAB nodes/number of hops that can exist in the network, meaning that this latency due to hopping can theoretically be relatively high for UE connected to the 5GC 104 via a route that uses many IAB nodes. Further, in some IAB architectures, an IAB node may be free to select to a different parent IAB node (e.g., the IAB node 114 that provides access to the UE of the first NPN/SNPN 304 and/or the second NPN/SNPN 306 may reselect to be the child of the IAB node 108 instead of the child of the IAB node 112) according to network conditions. In such cases, the speed possible on the new route to the 5GC (e.g., through the IAB node 108, IAB node 106, and IAB donor 102) may not guarantee the achievement of the QoS requirements for the application. Finally, each hop through the network represents a possible point of failure for information transfer, such that routes with a greater amount of hops through various IAB nodes may have a lower overall reliability.

Figure 4:
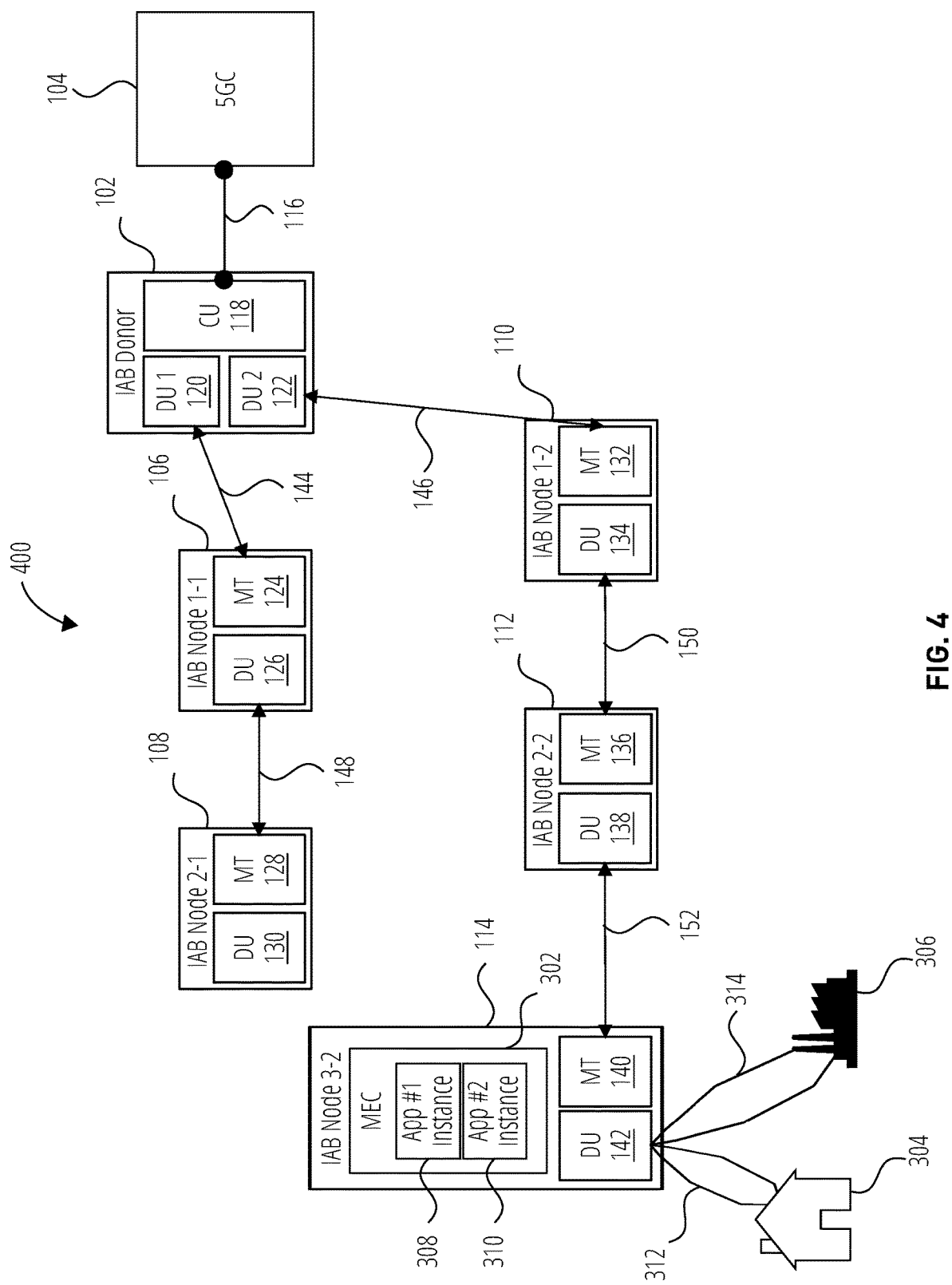
FIG. 4 illustrates an IAB network according to an embodiment.

FIG. 4 illustrates an IAB network 400 according to an embodiment. The IAB network 400 may include the IAB donor 102, the 5GC 104, the IAB node 106, the IAB node 108, the IAB node 110, the IAB node 112, and the IAB node 114 of FIG. 1 (along with their component parts and connections to each other, in the manner described in FIG. 1). Further, the IAB network 400 may also include the first NPN/SNPN 304 having the UE connected to the DU 142 of the IAB node 114 via the first plurality of access links 312, and the second NPN/SNPN 306 having the UE that are connected to the DU 142 of the IAB node 114 via the second plurality of access links 314, as described in relation to FIG. 3.

In FIG. 4, the MEC functionality 302 has been located in the IAB node 114 (instead of the 5GC 104 as in FIG. 3). The MEC functionality 302 includes the application #1 instance 308 and the application #2 instance 310, as these are also described in relation to FIG. 3. An IAB node that is capable of functioning as a MEC edge node may be described herein as an IAB MEC.

The location of the MEC functionality 302 within the IAB node 114 (e.g., the use of an IAB MEC) allows for relatively lower latency and higher reliability communications between the UE of the first NPN/SNPN 304 and/or second NPN/SNPN 306 and the corresponding application #1 instance 308 and/or application #2 instance 310 (due to no need to traverse back to the 5GC 104 via the hops between the IAB node 114 and the IAB node 112, the IAB node 112 and the IAB node 110, and the IAB node 110 and the IAB donor 102). Further, by using an IAB MEC having the application #1 instance 308 and the application #2 instance 310, the application may continue to function with the UE of the first NPN/SNPN 304 and the second NPN/SNPN 306, even in the case that the route from the IAB node 114 back to the 5GC 104 is congested or non-functional. The use of an IAB MEC may also allow for more finely-tuned device (UE) and network (corresponding NPN/SNPN) management, while still ensuring that accounting and other centralized management abilities from an operator perspective are maintained. Finally, IAB MECs may enable new business models. For example, 3rd party IAB MECs may be developed that are customized for use with certain applications (e.g., that are configured to provide certain application instances).

It is also contemplated that locating the MEC functionality 302 at the IAB node 114 may also be beneficial in the case of an application for a UE connected to the IAB node 114 and that corresponds to either of, e.g., the application #1 instance 308 or the application #2 instance 310, but that is not (necessarily) used on a corresponding NPN/SNPN. In other words, the use of the first NPN/SNPN 304 and the second NPN/SNPN 306 in the embodiment shown in FIG. 4 is given by way of example—it is contemplated that benefits of locating MEC functionality on an IAB node as described herein do not inherently require an NPN/SNPN to be so established.

Various potential use cases for IAB MECs are contemplated. For example, IAB MECs may be used to host application instances of applications for using augmented reality (AR), virtual reality (VR), and/or vehicle-to-everything (V2X) communications, industrial internet of things (IIOT) applications, or any other case that may benefit from the ability to meet relatively strict QoS requirements (e.g., low latency and/or high reliability) in the context of an IAB network.

It is contemplated that in some cases, multiple IAB MECs may be used in a repeater configuration. It is contemplated that in some cases, multiple IAB MECs may be used to form a local network that includes the IAB MECs. For each of these options, at least two modes of operation are contemplated. In a first mode, each IAB MEC may be in a sidelink relay mode. In a second mode, each IAB MEC is centrally controlled by a macro node depending on needed capacity.

In order to practically and commercially achieve IAB MECs, various considerations may need to be taken into account. A first of category these considerations relates to 3GPP core functions. Firstly, it may be that consideration should be given to the enablement of third party devices which are not privy to original equipment manufacturer (OEM) integration procedures into operator networks. Accordingly, frameworks for integrating a third party IAB MEC into an existing carrier network may be beneficial.

Secondly, an IAB MEC would need to implement content caching techniques that go through the CU and retrieve appropriate content as needed (e.g., for updating application instances at the IAB MEC). Since IAB nodes may not provide for direct contact between an IAB node and the 5GC, a CU of an IAB donor may have to enable this operation. Accordingly, existing mechanisms for IAB networks may accordingly be updated within the RAN and CN domains to account for this.

Thirdly, in some cases, a UPF may need to be moved to the IAB MEC. Accordingly, mechanisms for distributed UPF architectures may be beneficial.

Fourthly, security with third party relays may be a concern, particularly in split PDCP architectures to be discussed. Relatedly, a framework of solutions to inter-operability issues (in the case of differing vendors for an IAB MEC and a UE) may be developed.

A second category of these considerations relates to 3GPP usage. Cases are anticipated where, due to backhaul failures on IAB MEC and/or backhaul or some other failure on a parent node to the IAB MEC) some services of an application will work while others are offline (e.g., services of the application that use access to the internet through the failed route may be offline). For example, in the case of a failure on a backhaul and/or node between the IAB MEC and the CU on the corresponding IAB donor, the local content for the application available in the application instances at the IAB MEC can still be provided to the UE. However, services of the application needing real time connectivity to the internet might not work. This combination may provide the user with a confusing user experience if this situation is not gracefully handled. Accordingly, applications may be implemented such the experience is uniform throughout these instances (or such that appropriate actions are taken to ensure that the user understands the reasons for the difference in experience).

A third category of these considerations relates to 3GPP RAN. Firstly, in some IAB nodes, there may be no PDCP layer capable of connecting the IAB node with MEC functionality present on the 5GC. For example, in some cases, an IAB node terminates at the RLC layer, while the MEC functionality (which may be currently within the 3GPP core) communicates using IP layer. Further, locating a MEC at the CU of the IAB donor instead (which can communicate through IP) may defeat the purpose of localized MEC since the UE needing service might still be multiple hops from the IAB donor (thus still being bound by QoS issues stemming from the need to hop).

Secondly, in some cases (e.g., commercial deployments), an IAB node and a CU of an IAB donor communicate using the F1 interface. It may be that related F1AP standards are vendor driven and up to implementation of a network operator and/or network node vendors. Accordingly, there may be no easy way to create a F1 interface between a CU of an IAB donor and a 3rd party IAB node. Accordingly, in the case of an IAB MEC, alternates to F1-C interfaces may need to be considered to ensure proper control of an IAB MEC by the CU of the IAB donor.

Systems and methods described herein may describe mechanisms that can be used to integrate IAB MECs (including 3rd party IAB MECs) into operator networks in a way that is secure and provides seamless service on-boarding. These may account for architectural impacts on such systems, describe CN functionalities that may be available through an IAB donor for accessing and managing IAB MEC functionalities, modifications needed to protocol stacks in IAB MECs and/or other nodes, and/or modifications to scheduling and grant request procedures performed on IAB MECs, among other possibilities.

Figure 5:
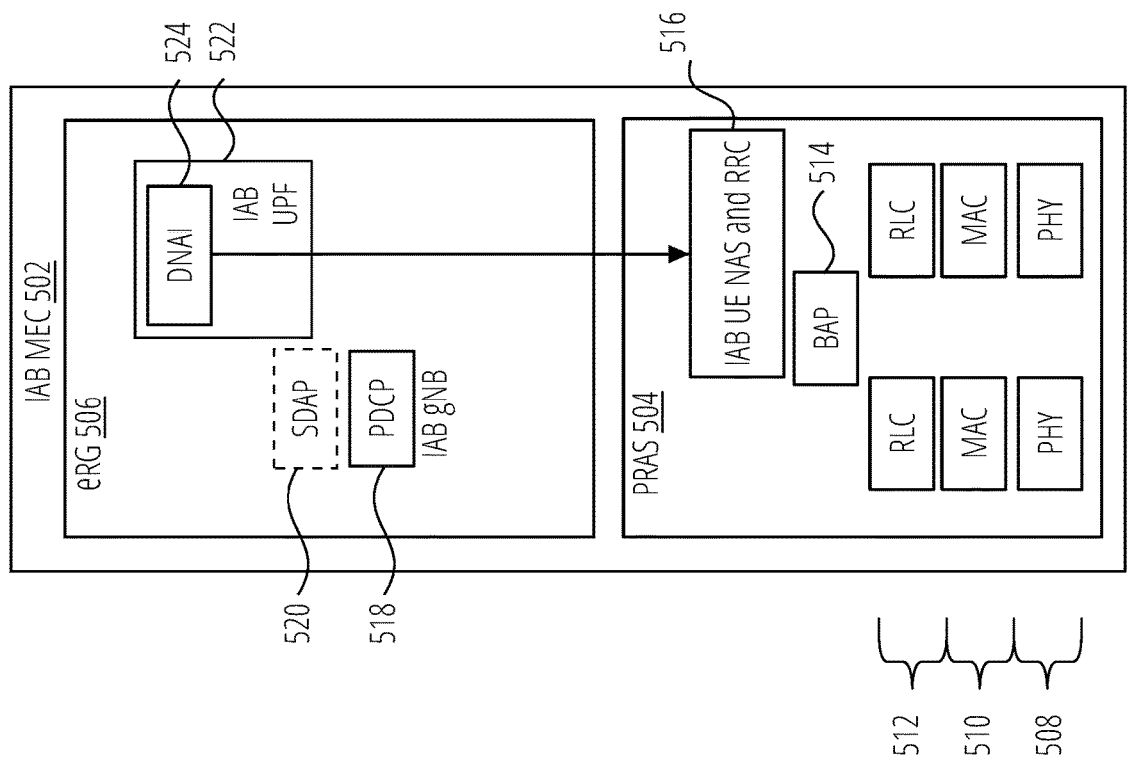
FIG. 5 illustrates an IAB MEC, according to an embodiment.

FIG. 5 illustrates an IAB MEC 502, according to an embodiment. The IAB MEC 502 includes a premises radio access station (PRAS) 504 and an enhanced residential gateway (eRG) 506. The PRAS 504 includes the PHY layers 508, the MAC layers 510, the RLC layers 512, and the BAP layer 514 that may be used for IAB communications using an IAB node in some embodiments, as described in relation to, e.g., the second IAB node 204 of FIG. 2. The PRAS 504 may also include the NAS and RRC layers 516, which may be associated with an IAB UE functionality of the IAB MEC 502 (as illustrated).

The eRG 506 may include the PDCP layer 518 and (in some embodiments) the SDAP layer 520. As illustrated, these may be associated with an IAB gNB functionality of the IAB MEC 502. The eRG 506 may further include an IAB UPF 522 that is associated to a data network access identifier (DNAI) 524. The IAB UPF 522 may be for an application instance that is provided by the IAB MEC 502, in the manner described above. As illustrated, the DNAI 524 may be provided to the PRAS 504 to allow for UPF registration with a CN, as will be described.

The division of functionalities of the IAB MEC 502 between the PRAS 504 and the eRG 506 is given by way of example and not by way of limitation. In other words, an IAB MEC could have the functionalities described in relation to FIG. 5 without necessarily formally dividing them between, specifically, a PRAS and an eRG.

The IAB MEC 502 may receive instructions to send traffic of certain QoS flow(s) to the IAB UPF 522 (e.g., according to a correspondence in the system between that QoS flow and an instance of an application on the IAB UPF 522). Accordingly, the PDCP layer 518 of the IAB MEC 502 may be configured to route traffic those QoS flows to the IAB UPF 522.

In some embodiments (e.g., where there is no SDAP layer 520 in the IAB MEC 502), there may be a one-to-one correspondence between DRBs between the UE and the IAB MEC 502 and these indicated QoS flow(s). In such a case, the PDCP layer 518 may route the QoS flow(s) to the IAB UPF 522 by routing their associated DRB(s) to the IAB UPF 522.

In other embodiments (e.g., where there is an SDAP layer 520 in the IAB MEC 502), one or more of the indicated QoS flow(s) could be mapped to a same DRB by/through the SDAP layer 520.

In other embodiments (e.g., where there is and SDAP layer 520 in the IAB MEC 502), there may be no restriction on the mapping of the indicated QoS flows to a specific DRB. In such cases, the SDAP layer 520 may route PDCP PDUs belonging to the indicated QoS flow(s) to the IAB UPF 522, and further re-route PDCP PDUs belonging to non-indicated QoS flow(s) to an upstream IAB donor for receipt at a CN. In such cases, the PDCP layer for a same DRB is instantiated both locally at the UE and at the IAB-MEC node. There may control plane signaling between these instances along an E1' interface to provide coherence between the protocol layers of the UE and the IAB MEC 502.

Figure 6A:
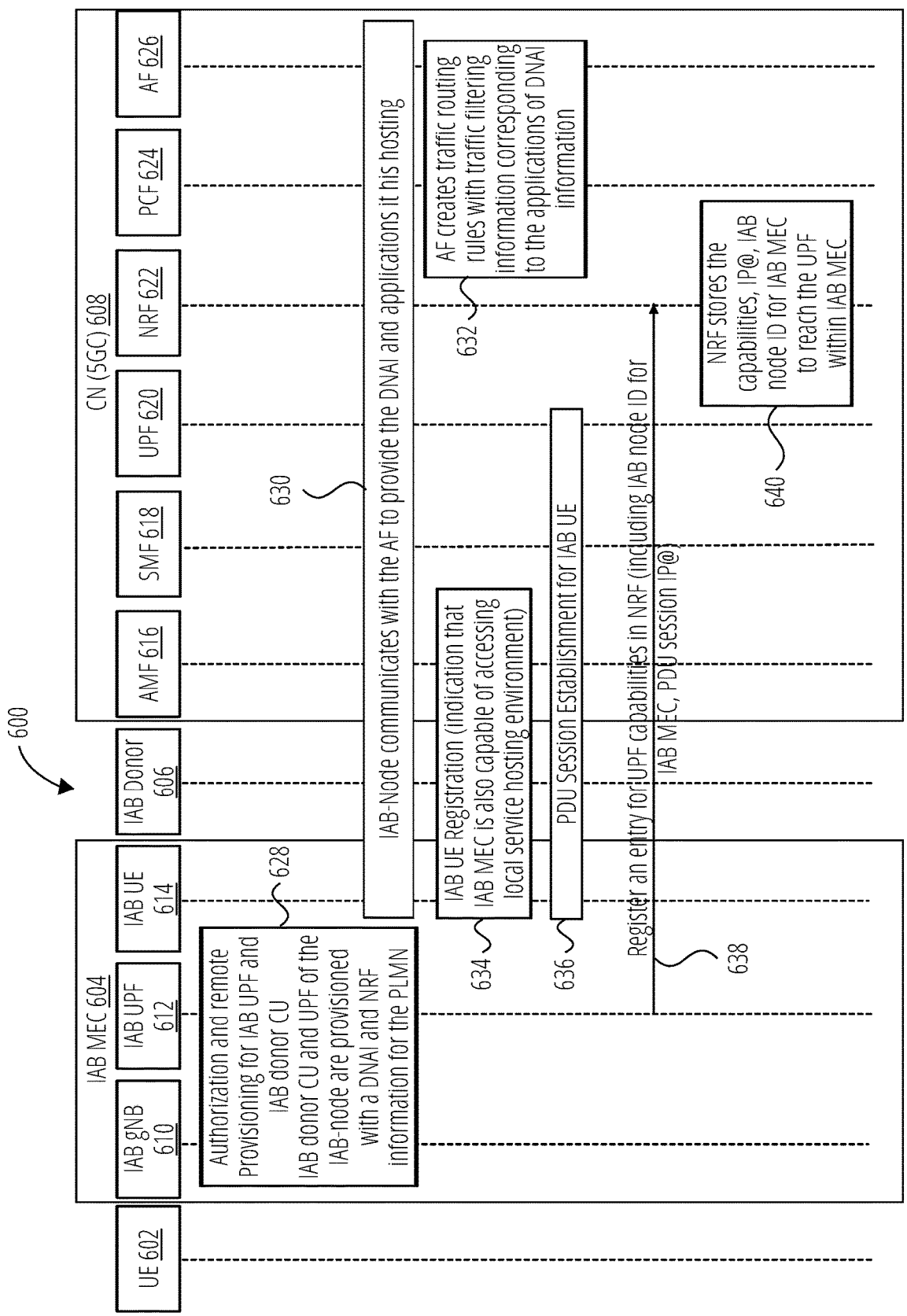
FIG. 6A through FIG. 6C illustrate a flow diagram for establishing a PDU session between a UE and an IAB MEC, according to an embodiment.
Figure 6B:
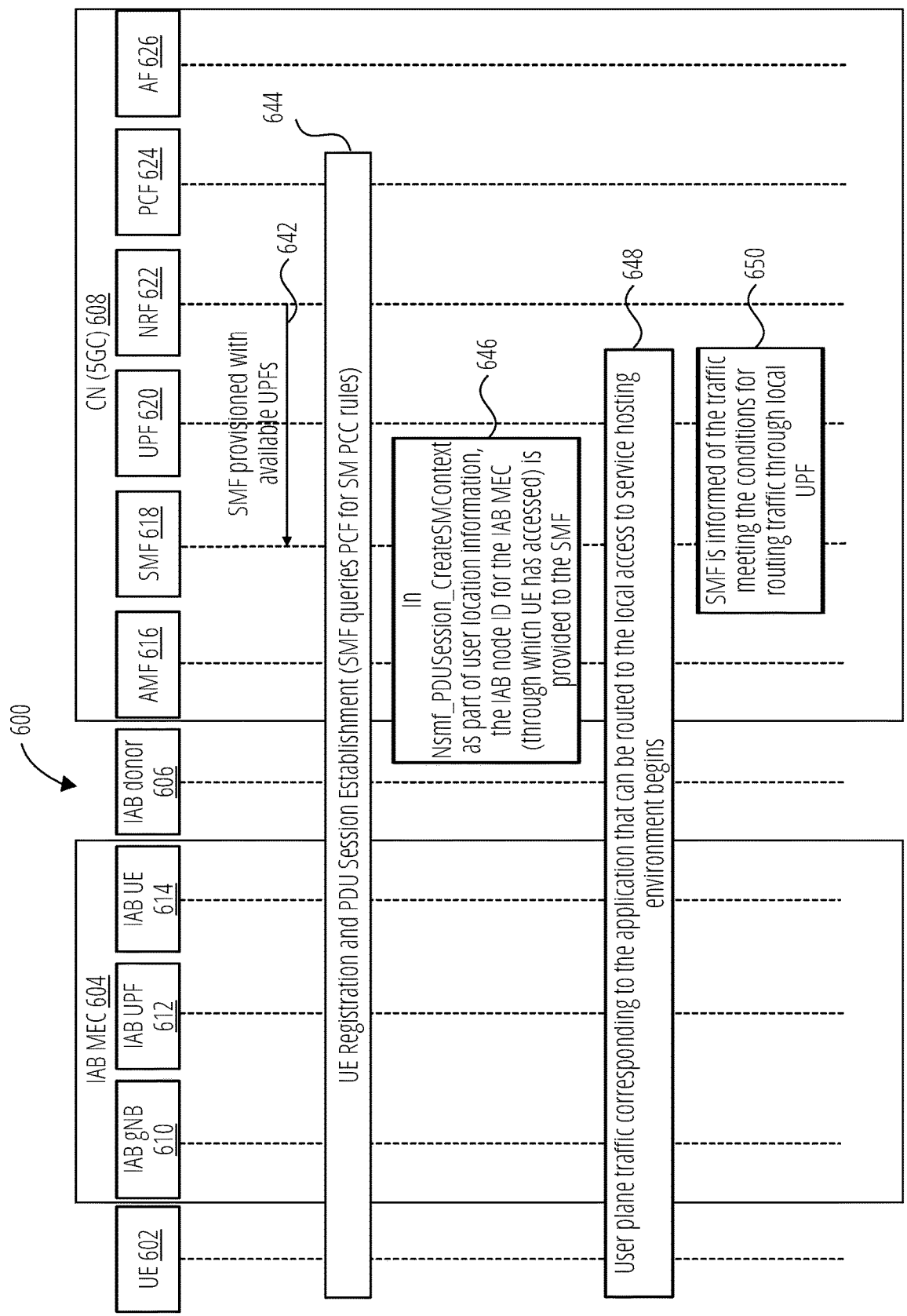
Figure 6C:
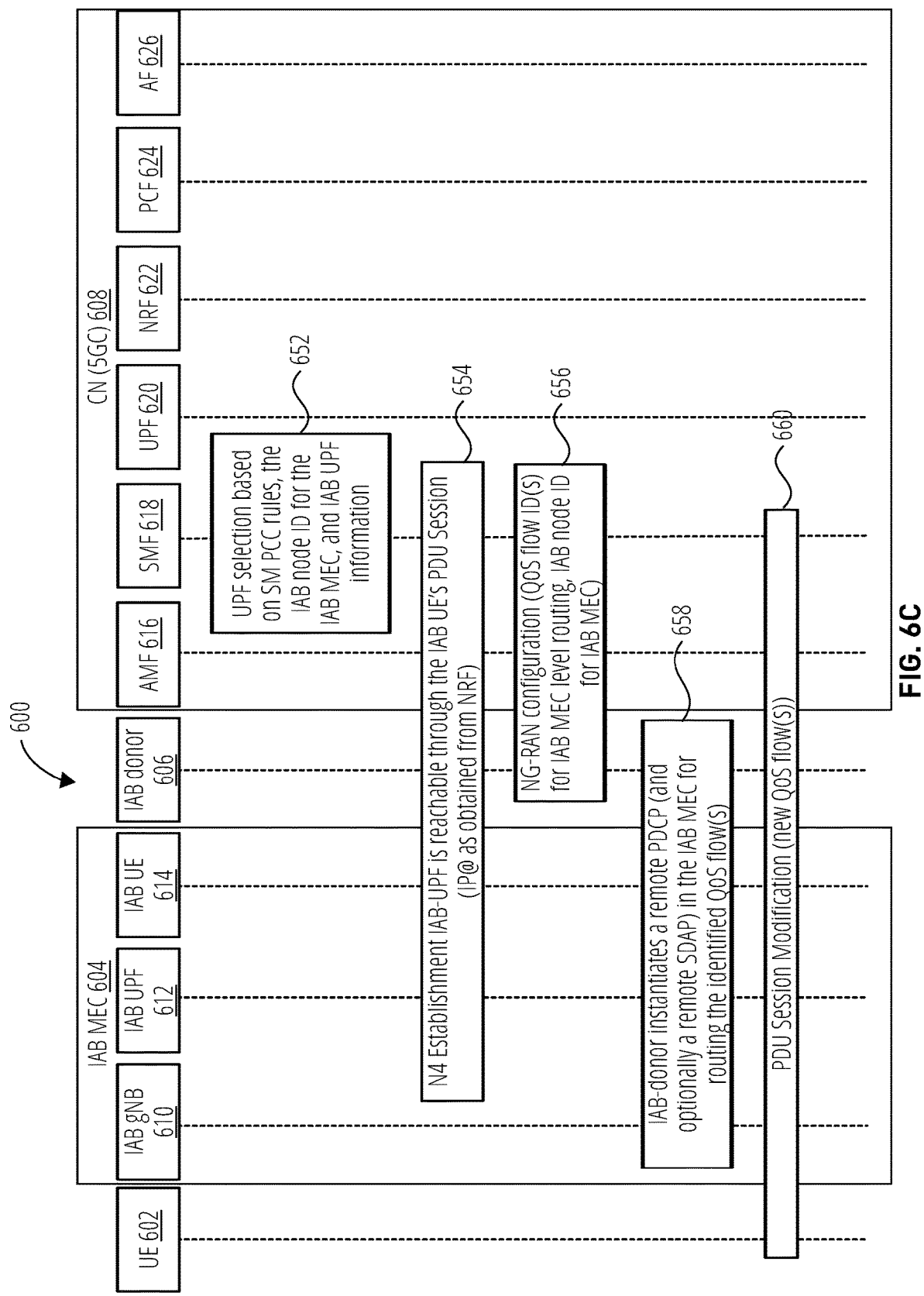

FIG. 6A through FIG. 6C illustrate a flow diagram 600 for establishing a PDU session between a UE 602 and an IAB MEC 604, according to an embodiment. A PDU session between the UE 602 and the IAB MEC 604 may allow for an application operating on the UE 602 to function with an instance of the application that is present on a MEC functionality of the IAB MEC, as described above.

The flow diagram 600 also illustrates an IAB donor 606, and a CN 608. In the flow diagram 600, the UE 602 may have established an access link with the IAB MEC 604. The IAB MEC 604 may communicate with the IAB donor 606 via a wireless backhaul of the IAB MEC 604 (either directly, or indirectly through additional IAB nodes (not illustrated)). The IAB donor 606 may be connected to the CN 608 via a fiber backhaul. The CN 608 may be, for example, a 5GC, as illustrated.

The IAB MEC 604 includes the IAB gNB functionality 610, the IAB UPF 612, and the IAB UE functionality 614. The IAB gNB functionality 610 may include the functionality to operate the IAB MEC 604 in a gNB context (e.g., as an access node for the UE 602). The IAB UPF 612 may include an instance of the application (that can operate with the application on the UE 602) for which the PDU session is to be set up. The IAB UE functionality 614 may include the functionality to operate the IAB MEC 604 in a UE context (e.g., as a child of the IAB donor 606). The IAB MEC 604 may instantiate the IAB UPF 612 (including the application instance) based on its prior programming/a prior configuration, or the CN 608 may provide the IAB UPF 612 instructions for instantiating the IAB UPF 612 and/or the included application instance.

The CN 608 includes an access and mobility management function (AMF) 616, a session management function (SMF) 618, a UPF 620, a network repository function (NRF) 622, a policy control function (PCF) 624, and an application function (AF) 626.

The flow diagram 600 includes authorizing and provisioning 628 for the IAB UPF 612 and the CU of the IAB donor 606. The authorizing and provisioning 628 may be performed by an operations, administration, and maintenance (OAM) aspects set by the mobile network operator (MNO) for the CN 608. Parameters provided to the IAB UPF 612 as part of the authorizing and provisioning 628 include a DNAI to identify the IAB UPF 612, access information (e.g., a fully qualified domain name (FQDN) and/or an IP address), and credentials for accessing the NRF 622.

The flow diagram 600 includes the communication 630 between the IAB MEC 604 and the AF 626 of the CN 608 to provide the AF 626 with the DNAI of the IAB UPF 612, and information regarding/identification of application(s) for which the IAB UPF 612 is hosting instances. The communication 630 may be an application level interaction that can occur multiple times. For example, the communication 630 may occur upon registration of the IAB MEC 604 with the CN 608. The communication 630 may also occur whenever new application instances are instantiated in the IAB UPF 612.

The flow diagram 600 includes the creation 632, at the AF 626, of traffic routing rules with traffic filtering information corresponding to the applications for the DNAI information (e.g., as provided in the communication 630). The creation 632 may be an application level interaction that can occur multiple times (e.g., whenever information regarding applications for DNAI information is received from the IAB MEC 604 according to a communication 630).

The flow diagram 600 includes the registration 634 IAB UE functionality 614 of the IAB MEC 604 with the AMF 616 of the CN 608. This registration 634 may provide the AMF 616 of the CN 608 with capability information for the IAB MEC 604. For example, an indication that the IAB MEC 604 is capable of providing access to local service hosting environment may be provided. In such cases, the indication may indicate that the IAB MEC 604 is capable of operating the IAB UPF 612 functionality and a PDCP layer for the IAB donor 606. In some cases, the indication may also indicate that the IAB MEC 604 is capable of operating an SDAP layer for the IAB donor 606.

The flow diagram 600 includes the establishment 636 of a PDU session between the IAB UE functionality 614 of the IAB MEC 604 and the UPF 620 of the CN 608.

While the registration 634 and the establishment 636 have been illustrated as occurring concurrently with the creation 632, it should be understood that the creation 632 could occur prior to, or after, either of the registration 634 and the establishment 636.

The flow diagram 600 includes the registration 638, by the IAB UPF 612 of the IAB MEC 604, of an entry for the capabilities of the IAB UPF 612 with the NRF 622 of the CN 608. As part of the registration 638, the IAB MEC 604 contacts the NRF 622 and registers a network function (NF) profile for the IAB UPF 612 with the NRF 622. This NF profile may include the IAB node identifier for the IAB MEC 604 and an IP address corresponding to the PDU session between the IAB UE functionality 614 of the IAB MEC 604 and the UPF 620 of the CN 608. This NF profile may also specify capabilities of the UPF (e.g., whether it communicates via internet protocol (IP) v4 and or IPv6, etc.).

The flow diagram 600 includes the storage 640 of the capabilities of the IAB UPF 612, the IP address of the PDU session between the IAB UE functionality 614 and the UPF 620, and the IAB node identifier for the IAB MEC 604 at the NRF 622. This information may later enable the CN 608 to reach the IAB UPF 612 within the IAB MEC 604.

The flow diagram 600 includes the provision 642 of information on the IAB UPF 612 from the NRF 622 to the SMF 618. For example, in the CN 608, one or more SMFs (including the SMF 618) may have subscribed to receive information on new UPF NF profiles with the NRF 622. Accordingly, the NRF 622 may inform the SMF 618 of the NF profile for the IAB UPF 612. The SMF 618 may determine that the IAB UPF 612 is present on the IAB MEC 604 by locating the IAB node identifier for the IAB MEC 604 in the NF function for the IAB UPF 612 on the NRF 622. In some embodiments, the provision 642 is optional. In cases where the provision 642 is not performed, it may be instead that the SMF determines that the IAB UPF 612 is present on the IAB MEC 604 through another configuration means (e.g., via proprietary OAM signaling).

The flow diagram 600 includes the registration and PDU session establishment 644 of the UE 602 with the CN 608. The UE 602 may communicate with the PCF 624 of the CN 608 to establish a PDU session between the UE 602 and the UPF 620 of the core network. This may occur as part of a session management (SM) process. Note that in the flow diagram 600, communications illustrated between the UE 602 and the CN 608 occur via the IAB MEC 604 (to which the UE 602 has a direct access link) and the IAB donor 606 (and via any intervening IAB nodes between the IAB MEC 604 and the IAB donor 606 (not illustrated)).

As part of the registration and PDU session establishment 644, the SMF 618 queries the PCF 624 for SM policy and charging control (PCC) rules. The PCF 624 may provide the SM PCC rules associated with the PDU session between the UE 602 and the CN 608 as generated by the PCF 624 based on the DNAI information and the identification of the application(s) for which the IAB UPF 612 is hosting instances, as received from the AF 626. The SMF 618 uses these SM PCC rules to create traffic detection rules for this traffic at the UPF 620.

The flow diagram 600 includes the provision 646 of user location information for the UE 602 from the AMF 616 to the SMF 618. The user location information for the UE 602 may have been determined by the AMF 616 as part of the registration and PDU session establishment 644. As part of the user location information, the IAB node identifier for the IAB MEC 604 (with which the UE 602 has an access link) may be provided. This information may be included in an Nsmf_PDUSession_CreateSMContext information element passed from the AMF 616 to the SMF 618 as part of SM context establishment at the SMF 618. This may inform the SMF 618 that network access to the UE 602 is provided (most directly) by the IAB MEC 604 (e.g., that the access link used by the UE 602 for network communications is with the IAB MEC 604). The provision 646 may occur during (as part of) the registration and PDU session establishment 644.

The flow diagram 600 includes the beginning 648 of user plane traffic corresponding to the application that can be routed to the local access to the service hosting environment (e.g., to an application instance of the IAB UPF 612) between the UE 602 and the UPF 620 of the CN 608.

The flow diagram 600 includes the informing 650 of the SMF 618, by the UPF 620, that traffic corresponding to the traffic filter previously configured the AF 626 (e.g., traffic meeting the conditions for routing traffic to the IAB UPF 612 corresponding to an SM PCC rule associated with the PDU session between the UE 602 and the CN 608) is present between the UE 602 and the UPF 620. The informing 650 may occur in response to the UPF 620 determining that the SM PCC rule applies to the traffic, where the UPF 620 uses the traffic detection rules configured to the UPF 620 by the SMF 618 during the registration and PDU session establishment 644 for this purpose.

The flow diagram 600 includes the selection 652, at the SMF 618, to use the IAB UPF 612 based on SM PCC rules identifying that traffic can be routed to the IAB UPF 612, the IAB node identifier for the IAB MEC 604, and the information about the IAB UPF known to the AMF 616. For example, the SMF 618 may determine that the traffic can be routed to the IAB UPF 612 according to the SM PCC rules due to the detection and subsequent informing 650 by the UPF 620 as described.

Further, the SMF 618 may be aware that the IAB UPF 612 is present on the IAB MEC 604 due to the provision 642 to the SMF 618 of the NF profile information for the IAB UPF 612 (that includes the IAB node identifier for the IAB MEC 604). The SMF 618 may also be aware that the UE 602 (which is providing the traffic in question) is connected to the IAB MEC 604 due to the provision 646 of the user location information including the IAB node identifier for the IAB MEC 604 through which the UE 602 connects to the SMF 618. Accordingly, the SMF 618 may determine that the UE 602 communicates with the network via the same IAB MEC 604 having the IAB UPF 612 by matching the IAB node identifier from the user location information for the UE 602 to the IAB node identifier from the NF profile for the IAB UPF 612.

Accordingly, based on the determination that the traffic between the network and the UE 602 corresponds to the SM PCC rule, and a determination that each of the NF profile for the IAB UPF 612 and the user location information for the UE 602 include the (same) IAB node identifier for the IAB MEC 604, the SMF 618 determines that the traffic may (and, e.g., should) be routed to the IAB UPF 612 of the IAB MEC 604 (instead of, e.g., the UPF 620 of the CN 608). The SMF 618 may associate the traffic to be routed to the IAB UPF 612 with new QoS identifier(s).

The flow diagram 600 includes the N4 establishment procedures 654 between the SMF 618 and the IAB UPF 612. For example, an N3 tunnel establishment may be performed, and the IAB UPF 612 may be enabled to handle traffic from the UE 602 within the network. The N4 establishment procedures 654 may be based on the IP address of the current PDU session between the IAB UE functionality 614 of the IAB MEC 604 and the UPF 620 of the CN 608. This IP address may serve as the IP address for the IAB UPF 612 from the perspective of upstream elements (e.g., the IAB donor 606 and/or the CN 608).

The flow diagram 600 includes the NG-RAN configuration 656 between the SMF 618 and the IAB donor 606. The SMF 618 may inform the IAB donor 606 of the new QoS identifier(s). As part of the NG-RAN configuration 656, the SMF 618 may also inform the IAB donor 606 of the IAB node identifier for the IAB MEC 604 to which the identified QoS flows should be routed.

The flow diagram 600 includes the instantiation 658, by the IAB donor 606, of a PDCP layer and (optionally) an SDAP layer in the IAB MEC 604. This may occur according to instructions provided by the IAB donor 606 to the IAB MEC 604 as part of the instantiation 658. Reflective of their presence within an IAB node (the IAB MEC 604) rather than in, for example, the IAB donor 606, these layers may be understood to be "remote" layers (e.g., a remote PDCP layer and a remote SDAP layer). The instructions from the IAB donor 606 may configure the remote PDCP layer (and any remote SDAP layer) to route traffic associated with the identified QoS flow(s) (e.g., as described in relation to FIG.

5) to the IAB UPF 612. In some cases, the remote PDCP layer (and any remote SDAP layer) may be instantiated in an eRG of the IAB MEC 604 (as in FIG. 5).

The flow diagram 600 includes the PDU session modification 660 between the SMF 618 and the UE 602. As part of the PDU session modification 660, the SMF 618 may instruct the UE 602 to assign the traffic that is to be routed to the IAB UPF 612 to the new QoS flows. These instructions may also include the IAB node identifier for the IAB MEC 604.

Figure 7:
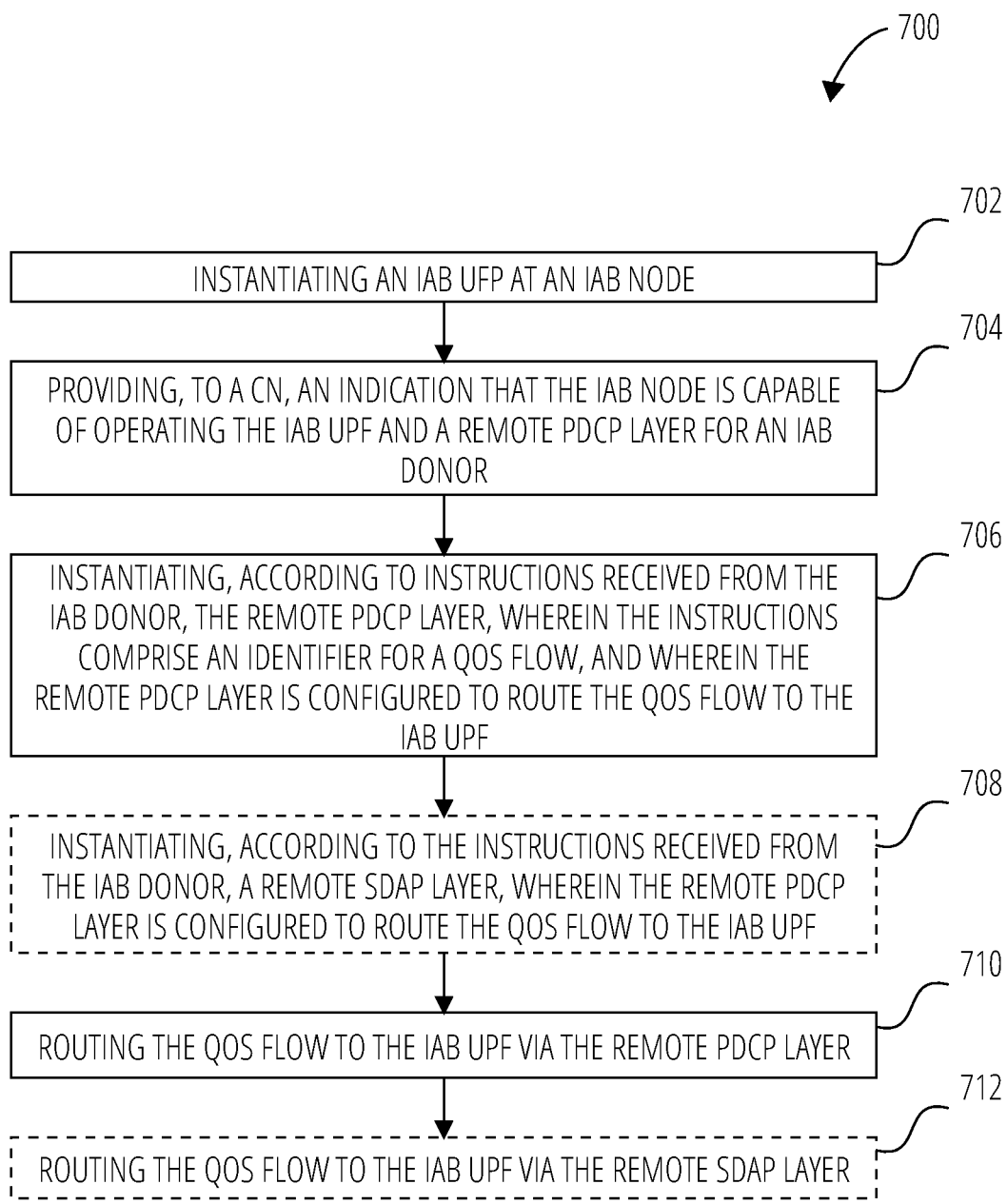
FIG. 7 illustrates a method of an IAB node for providing MEC, according to an embodiment.

FIG. 7 illustrates a method 700 of an IAB node for providing MEC, according to an embodiment. The method 700 includes instantiating 702 an IAB UPF at the IAB node.

The method 700 further includes providing 704, to a CN, an indication that the IAB node is capable of operating the IAB UPF and a remote PDCP layer for an IAB donor.

The method 700 further includes instantiating 706, according to instructions received from the IAB donor, the remote PDCP layer, wherein the instructions comprise an identifier for a QoS flow, and wherein the remote PDCP layer is configured to route the QoS flow to the IAB UPF.

The method 700 further optionally includes instantiating 708, according to the instructions received from the IAB donor, a remote SDAP layer, wherein the remote PDCP layer is configured to route the QoS flow to the IAB UPF.

The method 700 further includes routing 710 the QoS flow to the IAB UPF via the remote PDCP layer.

The method 700 further optionally includes routing 712 the QoS flow to the IAB UPF via the remote SDAP layer.

In some embodiments of the method 700, a DRB for the QoS flow is established with a UE connected to the IAB node.

In some embodiments, the method 700 further comprises registering an NF profile for the IAB UPF with an NRF of the CN, the NF profile comprising an IP address corresponding to a PDU session between the IAB node and the CN and an identifier for the IAB node.

In some embodiments, the method 700 further comprises performing N4 establishment for the IAB UPF with the CN.

In some embodiments, the method 700 further comprises sending, to the CN, a DNAI for the IAB UPF and an identification of an application associated with the IAB UPF.

In some embodiments, the method 700 further comprises receiving a DNAI for the IAB UPF.

In some embodiments, the method 700 further comprises receiving credentials for accessing an NRF of the CN.

Embodiments contemplated herein include an apparatus comprising means to perform one or more elements of the method 700. This apparatus may be, for example, an apparatus of a IAB node (such as a network device 1116 that is an IAB node, as described herein).

Embodiments contemplated herein include one or more non-transitory computer-readable media comprising instructions to cause an electronic device, upon execution of the instructions by one or more processors of the electronic device, to perform one or more elements of the method 700. This non-transitory computer-readable media may be, for example, a memory of an IAB node (such as a memory 1120 of a network device 1116 that is an IAB node, as described herein).

Embodiments contemplated herein include an apparatus comprising logic, modules, or circuitry to perform one or more elements of the method 700. This apparatus may be, for example, an apparatus of an IAB node (such as a network device 1116 that is an IAB node, as described herein).

Embodiments contemplated herein include an apparatus comprising: one or more processors and one or more computer-readable media comprising instructions that, when executed by the one or more processors, cause the one or more processors to perform one or more elements of the method 700. This apparatus may be, for example, an apparatus of an IAB node (such as a network device 1116 that is an IAB node, as described herein).

Embodiments contemplated herein include a signal as described in or related to one or more elements of the method 700.

Embodiments contemplated herein include a computer program or computer program product comprising instructions, wherein execution of the program by a processing element is to cause the processing element to carry out one or more elements of the method 700. The processor may be a processor of an IAB node (such as a processor(s) 1118 of a network device 1116 that is an IAB node, as described herein). These instructions may be, for example, located in the processor and/or on a memory of the IAB node (such as a memory 1120 of a network device 1116 that is an IAB node, as described herein).

Figure 8:
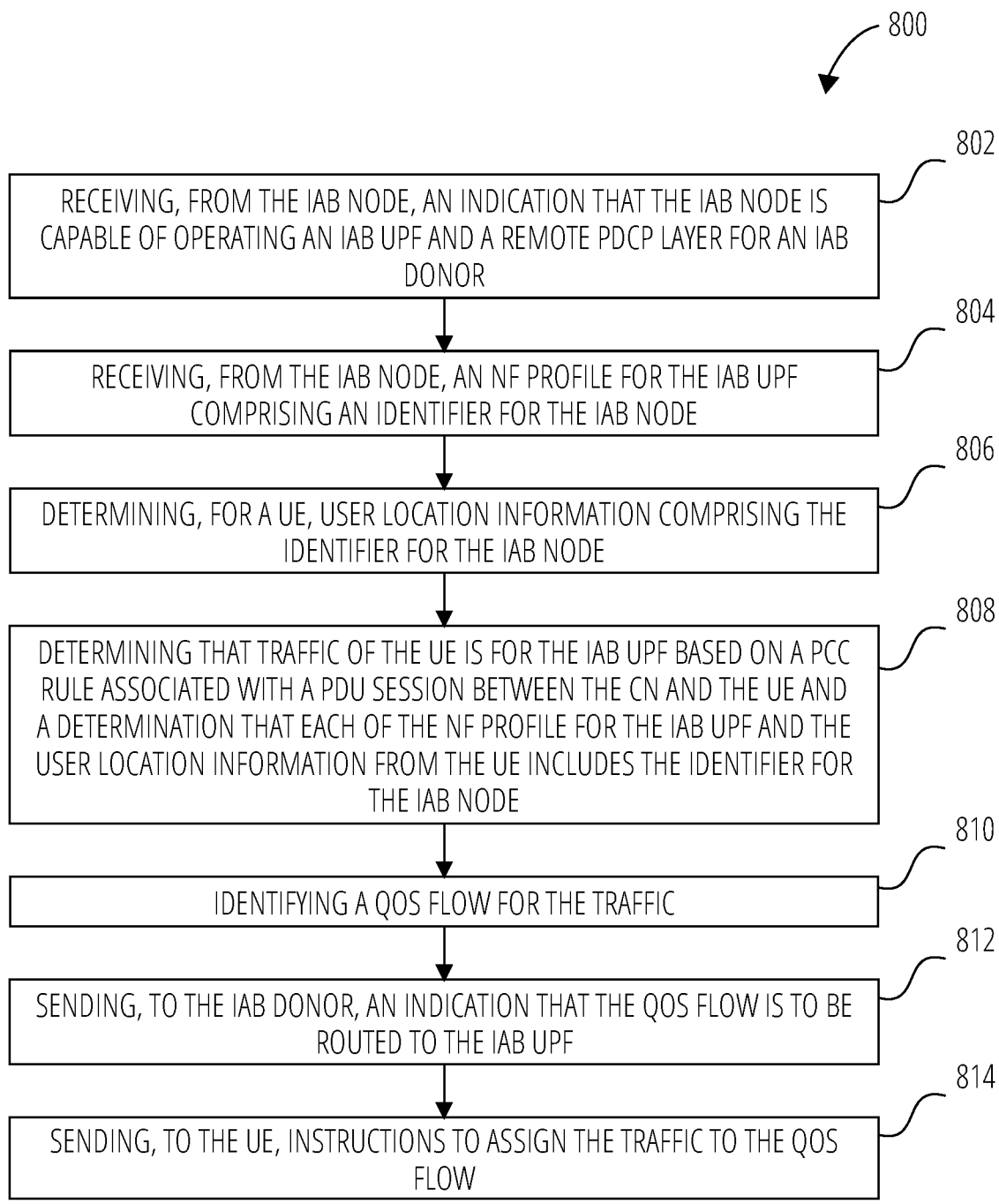
FIG. 8 illustrates a method of a CN for operating with an IAB node configured to provide MEC, according to an embodiment.

FIG. 8 illustrates a method 800 of a CN for operating with an IAB node configured to provide MEC, according to an embodiment. The method 800 includes receiving 802, from the IAB node, an indication that the IAB node is capable of operating an IAB UPF and a remote PDCP layer for an IAB donor.

The method 800 further includes receiving 804, from the IAB node, a NF profile for the IAB UPF comprising an identifier for the IAB node.

The method 800 further includes determining 806, for a UE, user location information comprising the identifier for the IAB node.

The method 800 further includes determining 808 that traffic of the UE is for the IAB UPF based on a PCC rule associated with a PDU session between the CN and the UE and a determination that each of the NF profile for the IAB UPF and the user location information for the UE includes the identifier for the IAB node.

The method 800 further includes identifying 810 a QoS flow for the traffic.

The method 800 further includes sending 812, to the IAB donor, an indication that the QoS flow is to be routed to the IAB UPF.

The method 800 further includes sending 814, to the UE, instructions to assign the traffic to the QoS flow.

In some embodiments of the method 800, the indication that the QoS flow is to be routed to the IAB UPF comprises an identifier for the QoS flow and the identifier for the IAB node.

In some embodiments of the method 800, the user location information is determined during establishment of a PDU session between the CN and the UE.

In some embodiments of the method 800, the NF profile for the IAB UPF further comprises an IP address corresponding to a PDU session between the IAB node and the CN.

In some embodiments, the method 800 further comprises performing N4 establishment for the IAB UPF with the IAB node based on the IP address corresponding to the PDU session between the IAB node and the CN.

In some embodiments, the method 800 further comprises receiving, from the IAB node, a DNAI for the IAB node and an identification of an application associated with the IAB UPF, and generating the PCC rule based on the DNAI and the identification of the application associated with the IAB UPF.

In some embodiments of the method 800, an NRF of the CN informs a SMF of the CN of the NF profile for the IAB UPF.

In some embodiments of the method 800, a determination that the PCC rule applies to the traffic is made by a UPF of the CN.

In some embodiments of the method 800, the determination that each of the NF profile for the IAB UPF and the user location information from the UE includes the identifier for the IAB node is made by an SMF of the CN.

Embodiments contemplated herein include an apparatus comprising means to perform one or more elements of the method 800. This apparatus may be, for example, an apparatus of a CN.

Embodiments contemplated herein include one or more non-transitory computer-readable media comprising instructions to cause an electronic device, upon execution of the instructions by one or more processors of the electronic device, to perform one or more elements of the method 800. This non-transitory computer-readable media may be, for example, a memory of a CN (or an element thereof).

Embodiments contemplated herein include an apparatus comprising logic, modules, or circuitry to perform one or more elements of the method 800. This apparatus may be, for example, an apparatus of a CN.

Embodiments contemplated herein include an apparatus comprising: one or more processors and one or more computer-readable media comprising instructions that, when executed by the one or more processors, cause the one or more processors to perform one or more elements of the method 800. This apparatus may be, for example, an apparatus of a CN.

Embodiments contemplated herein include a signal as described in or related to one or more elements of the method 800.

Embodiments contemplated herein include a computer program or computer program product comprising instructions, wherein execution of the program by a processing element is to cause the processing element to carry out one or more elements of the method 800. The processor may be a processor of a CN (or an element thereof). These instructions may be, for example, located in a processor and/or on a memory of a CN (or an element thereof).

Figure 9:
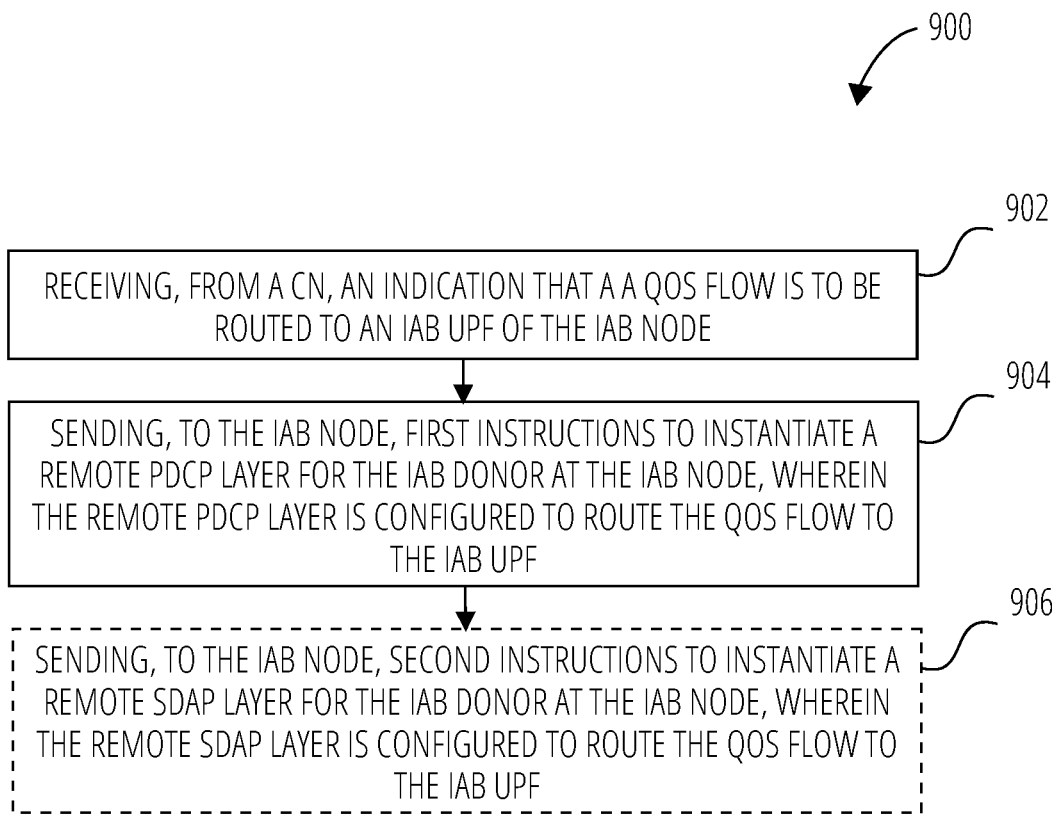
FIG. 9 illustrates a method for operating with an IAB node configured to provide MEC, in accordance with one embodiment.

FIG. 9 illustrates a method 900 of an IAB donor for operating with an IAB node configured to provide MEC, according to an embodiment. The method 900 includes receiving 902, from a CN, an indication that a QoS flow is to be routed to an IAB UPF of the IAB node.

The method 900 further includes sending 904, to the IAB node, first instructions to instantiate a remote PDCP layer for the IAB donor at the IAB node, wherein the remote PDCP layer is configured to route the QoS flow to the IAB UPF.

The method 900 further optionally includes sending 906, to the IAB node, second instructions to instantiate a remote SDAP layer for the IAB donor at the IAB node, wherein the remote SDAP layer is configured to route the QoS flow to the IAB UPF.

In some embodiments of the method 900, the indication comprises an identifier for the QoS flow and an identifier for the IAB node.

In some embodiments of the method 900, the first instructions comprise an identifier for the QoS flow.

Embodiments contemplated herein include an apparatus comprising means to perform one or more elements of the method 900. This apparatus may be, for example, an apparatus of an IAB donor.

Embodiments contemplated herein include one or more non-transitory computer-readable media comprising instructions to cause an electronic device, upon execution of the instructions by one or more processors of the electronic device, to perform one or more elements of the method 900. This non-transitory computer-readable media may be, for example, a memory of an IAB donor.

Embodiments contemplated herein include an apparatus comprising logic, modules, or circuitry to perform one or more elements of the method 900. This apparatus may be, for example, an apparatus of an IAB donor.

Embodiments contemplated herein include an apparatus comprising: one or more processors and one or more computer-readable media comprising instructions that, when executed by the one or more processors, cause the one or more processors to perform one or more elements of the method 900. This apparatus may be, for example, an apparatus of an IAB donor.

Embodiments contemplated herein include a signal as described in or related to one or more elements of the method 900.

Embodiments contemplated herein include a computer program or computer program product comprising instructions, wherein execution of the program by a processing element is to cause the processing element to carry out one or more elements of the method 900. The processor may be a processor of an IAB donor. These instructions may be, for example, located in a processor and/or on a memory of an IAB donor.

Figure 10:
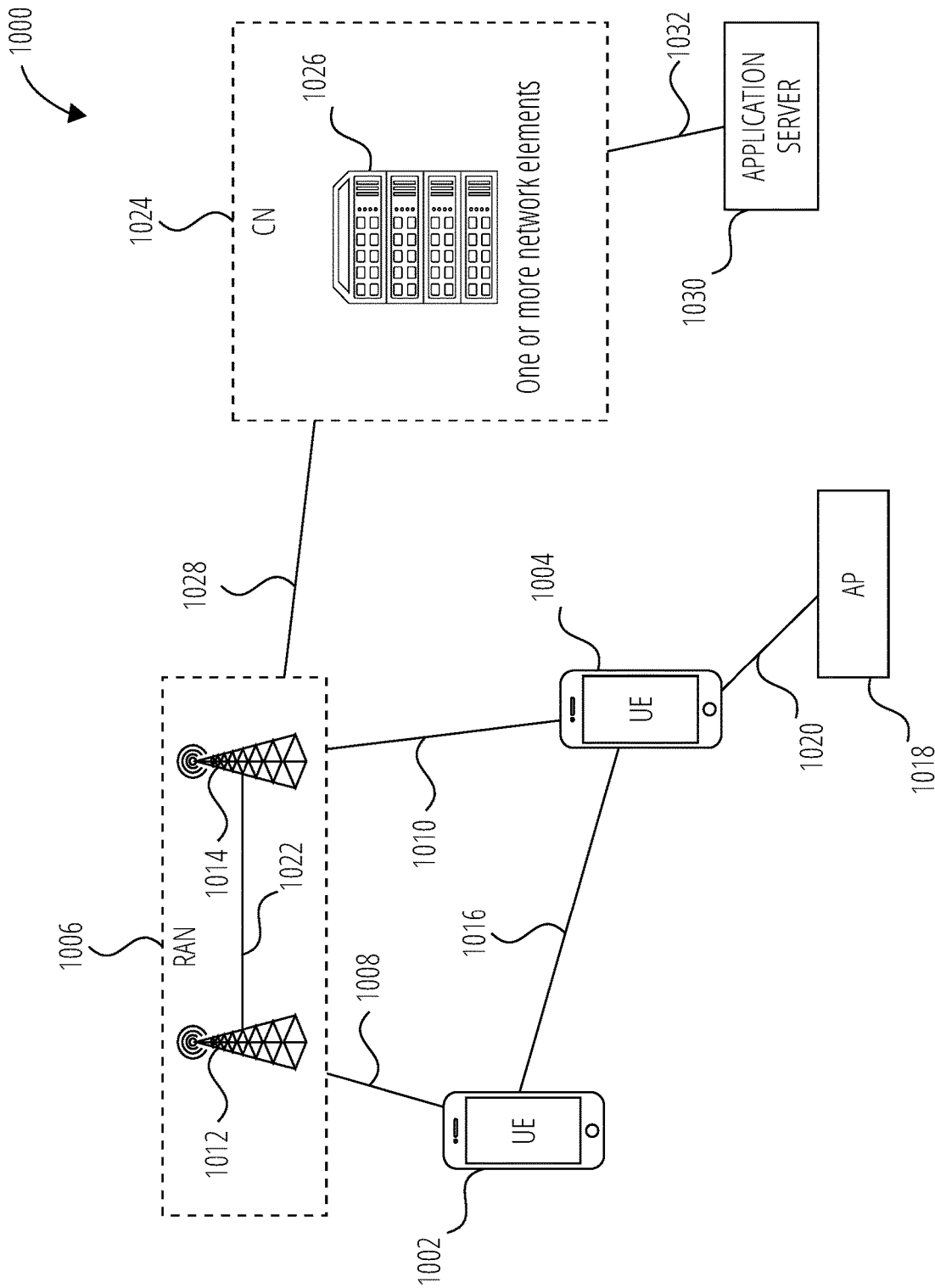
FIG. 10 illustrates an example architecture of a wireless communication system, according to embodiments disclosed herein.

FIG. 10 illustrates an example architecture of a wireless communication system 1000, according to embodiments disclosed herein. The following description is provided for an example wireless communication system 1000 that operates in conjunction with the LTE system standards and/or 5G or NR system standards as provided by 3GPP technical specifications.

As shown by FIG. 10, the wireless communication system 1000 includes UE 1002 and UE 1004 (although any number of UEs may be used). In this example, the UE 1002 and the UE 1004 are illustrated as smartphones (e.g., handheld touchscreen mobile computing devices connectable to one or more cellular networks), but may also comprise any mobile or non-mobile computing device configured for wireless communication.

The UE 1002 and UE 1004 may be configured to communicatively couple with a RAN 1006. In embodiments, the RAN 1006 may be NG-RAN, E-UTRAN, etc. The UE 1002 and UE 1004 utilize connections (or channels) (shown as connection 1008 and connection 1010, respectively) with the RAN 1006, each of which comprises a physical communications interface. The RAN 1006 can include one or more base stations, such as base station 1012 and base station 1014, that enable the connection 1008 and connection 1010.

In this example, the connection 1008 and connection 1010 are air interfaces to enable such communicative coupling, and may be consistent with RAT(s) used by the RAN 1006, such as, for example, an LTE and/or NR.

In some embodiments, the UE 1002 and UE 1004 may also directly exchange communication data via a sidelink interface 1016. The UE 1004 is shown to be configured to access an access point (shown as AP 1018) via connection 1020. By way of example, the connection 1020 can comprise a local wireless connection, such as a connection consistent with any IEEE 1102.11 protocol, wherein the AP 1018 may comprise a Wi-Fi® router. In this example, the AP 1018 may be connected to another network (for example, the Internet) without going through a CN 1024.

In embodiments, the UE 1002 and UE 1004 can be configured to communicate using orthogonal frequency division multiplexing (OFDM) communication signals with each other or with the base station 1012 and/or the base station 1014 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1012 or base station 1014 may be implemented as one or more software entities running on server computers as part of a virtual network. In addition, or in other embodiments, the base station 1012 or base station 1014 may be configured to communicate with one another via interface 1022. In embodiments where the wireless communication system 1000 is an LTE system (e.g., when the CN 1024 is an EPC), the interface 1022 may be an X2 interface. The X2 interface may be defined between two or more base stations (e.g., two or more eNBs and the like) that connect to an EPC, and/or between two eNBs connecting to the EPC. In embodiments where the wireless communication system 1000 is an NR system (e.g., when CN 1024 is a 5GC), the interface 1022 may be an Xn interface. The Xn interface is defined between two or more base stations (e.g., two or more gNBs and the like) that connect to 5GC, between a base station 1012 (e.g., a gNB) connecting to 5GC and an eNB, and/or between two eNBs connecting to 5GC (e.g., CN 1024).

The RAN 1006 is shown to be communicatively coupled to the CN 1024. The CN 1024 may comprise one or more network elements 1026, which are configured to offer various data and telecommunications services to customers/subscribers (e.g., users of UE 1002 and UE 1004) who are connected to the CN 1024 via the RAN 1006. The components of the CN 1024 may be implemented in one physical device or separate physical devices including components to read and execute instructions from a machine-readable or computer-readable medium (e.g., a non-transitory machine-readable storage medium).

In embodiments, the CN 1024 may be an EPC, and the RAN 1006 may be connected with the CN 1024 via an S1 interface 1028. In embodiments, the S1 interface 1028 may be split into two parts, an S1 user plane (S1-U) interface, which carries traffic data between the base station 1012 or base station 1014 and a serving gateway (S-GW), and the S1-MME interface, which is a signaling interface between the base station 1012 or base station 1014 and mobility management entities (MMEs).

In embodiments, the CN 1024 may be a 5GC, and the RAN 1006 may be connected with the CN 1024 via an NG interface 1028. In embodiments, the NG interface 1028 may be split into two parts, an NG user plane (NG-U) interface, which carries traffic data between the base station 1012 or base station 1014 and a user plane function (UPF), and the S1 control plane (NG-C) interface, which is a signaling interface between the base station 1012 or base station 1014 and access and mobility management functions (AMFs).

Generally, an application server 1030 may be an element offering applications that use internet protocol (IP) bearer resources with the CN 1024 (e.g., packet switched data services). The application server 1030 can also be configured to support one or more communication services (e.g., VoIP sessions, group communication sessions, etc.) for the UE 1002 and UE 1004 via the CN 1024. The application server 1030 may communicate with the CN 1024 through an IP communications interface 1032.

Figure 11:
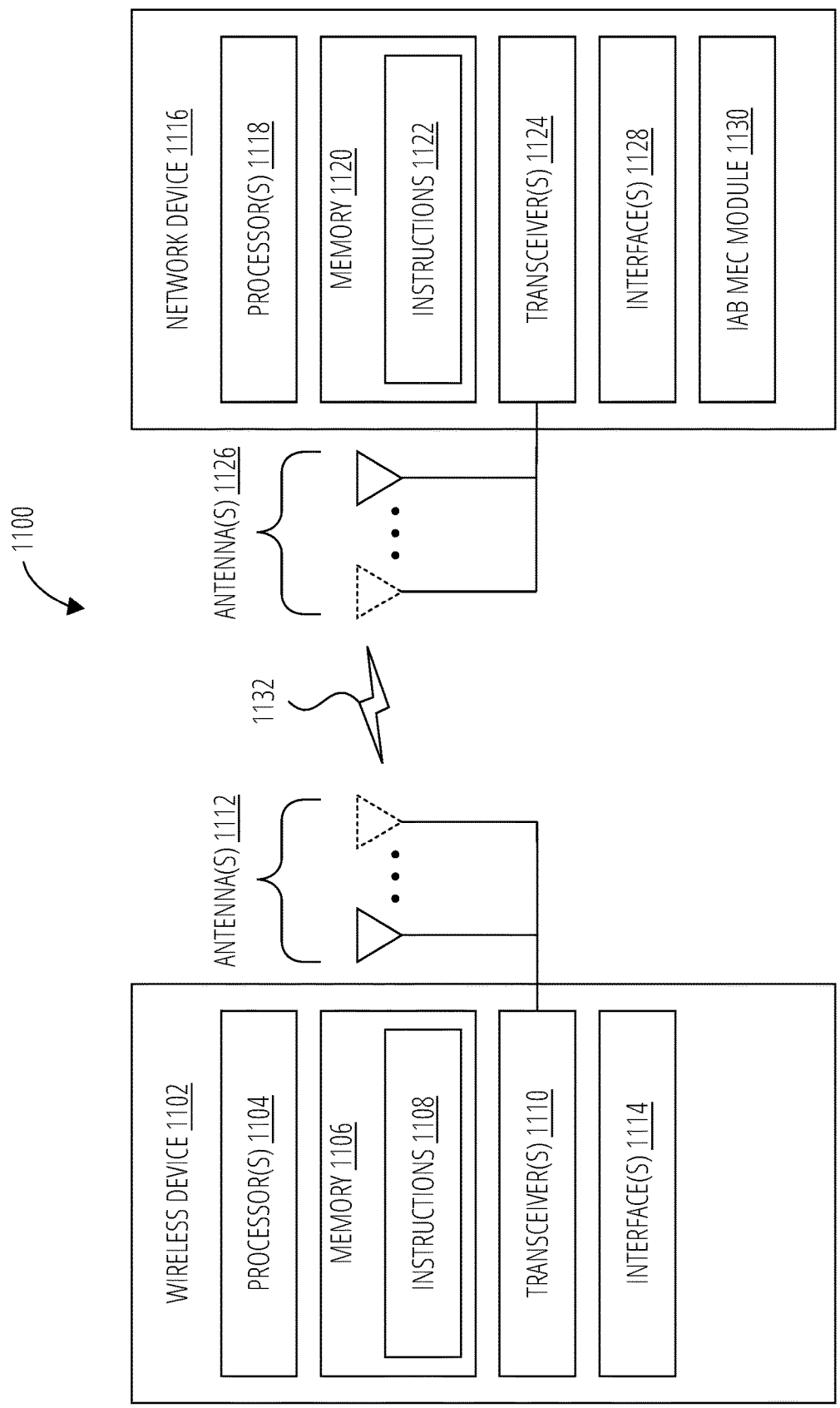
FIG. 11 illustrates a system for performing signaling between a wireless device and a network device, according to embodiments disclosed herein.

FIG. 11 illustrates a system 1100 for performing signaling 1132 between a wireless device 1102 and a network device 1116, according to embodiments disclosed herein. The system 1100 may be a portion of a wireless communications system as herein described. The wireless device 1102 may be, for example, a UE of a wireless communication system. The network device 1116 may be, for example, an IAB node or an IAB donor of a wireless communication system.

The wireless device 1102 may include one or more processor(s) 1104. The processor(s) 1104 may execute instructions such that various operations of the wireless device 1102 are performed, as described herein. The processor(s) 1104 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1102 may include a memory 1106. The memory 1106 may be a non-transitory computer-readable storage medium that stores instructions 1108 (which may include, for example, the instructions being executed by the processor(s) 1104). The instructions 1108 may also be referred to as program code or a computer program. The memory 1106 may also store data used by, and results computed by, the processor(s) 1104.

The wireless device 1102 may include one or more transceiver(s) 1110 that may include radio frequency (RF) transmitter and/or receiver circuitry that use the antenna(s) 1112 of the wireless device 1102 to facilitate signaling (e.g., the signaling 1132) to and/or from the wireless device 1102 with other devices (e.g., the network device 1116) according to corresponding RATs.

The wireless device 1102 may include one or more antenna(s) 1112 (e.g., one, two, four, or more). For embodiments with multiple antenna(s) 1112, the wireless device 1102 may leverage the spatial diversity of such multiple antenna(s) 1112 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1102 may be accomplished according to precoding (or digital beamforming) that is applied at the wireless device 1102 that multiplexes the data streams across the antenna(s) 1112 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1102 may implement analog beamforming techniques, whereby phases of the signals sent by the antenna(s) 1112 are relatively adjusted such that the (joint) transmission of the antenna(s) 1112 can be directed (this is sometimes referred to as beam steering).

The wireless device 1102 may include one or more interface(s) 1114. The interface(s) 1114 may be used to provide input to or output from the wireless device 1102. For example, a wireless device 1102 that is a UE may include interface(s) 1114 such as microphones, speakers, a touch-screen, buttons, and the like in order to allow for input and/or output to the UE by a user of the UE. Other interfaces of such a UE may be made up of transmitters, receivers, and other circuitry (e.g., other than the transceiver(s) 1110/antenna(s) 1112 already described) that allow for communication between the UE and other devices and may operate according to known protocols (e.g., Wi-Fi®, Bluetooth °, and the like).

The network device 1116 may include one or more processor(s) 1118. The processor(s) 1118 may execute instructions such that various operations of the network device 1116 are performed, as described herein. The processor(s) 1104 may include one or more baseband processors implemented using, for example, a CPU, a DSP, an ASIC, a controller, an FPGA device, another hardware device, a firmware device, or any combination thereof configured to perform the operations described herein.

The network device 1116 may include a memory 1120. The memory 1120 may be a non-transitory computer-readable storage medium that stores instructions 1122 (which may include, for example, the instructions being executed by the processor(s) 1118). The instructions 1122 may also be referred to as program code or a computer program. The memory 1120 may also store data used by, and results computed by, the processor(s) 1118.

The network device 1116 may include one or more transceiver(s) 1124 that may include RF transmitter and/or receiver circuitry that use the antenna(s) 1126 of the network device 1116 to facilitate signaling (e.g., the signaling 1132) to and/or from the network device 1116 with other devices (e.g., the wireless device 1102) according to corresponding RATs.

The network device 1116 may include one or more antenna(s) 1126 (e.g., one, two, four, or more). In embodiments having multiple antenna(s) 1126, the network device 1116 may perform MIMO, digital beamforming, analog beamforming, beam steering, etc., as has been described.

The network device 1116 may include one or more interface(s) 1128. The interface(s) 1128 may be used to provide input to or output from the network device 1116. For example, a network device 1116 that is a base station may include interface(s) 1128 made up of transmitters, receivers, and other circuitry (e.g., other than the transceiver(s) 1124/antenna(s) 1126 already described) that enables the base station to communicate with other equipment in a core network, and/or that enables the base station to communicate with external networks, computers, databases, and the like for purposes of operations, administration, and maintenance of the base station or other equipment operably connected thereto.

The network device 1116 may include an IAB MEC module 1130. The IAB MEC module 1130 may be implemented via hardware, software, or combinations thereof. For example, the IAB MEC module 1130 may be implemented as a processor, circuit, and/or instructions 1122 stored in the memory 1120 and executed by the processor(s) 1118. In some examples, the IAB MEC module 1130 may be integrated within the processor(s) 1118 and/or the transceiver(s) 1124. For example, the IAB MEC module 1130 may be implemented by a combination of software components (e.g., executed by a DSP or a general processor) and hardware components (e.g., logic gates and circuitry) within the processor(s) 1118 or the transceiver(s) 1124.

The IAB MEC module 1130 may be used for various aspects of the present disclosure, for example, aspects of FIG. 7 through FIG. 9. For example, for a network device 1116 that is an IAB node for MEC (an IAB MEC), the IAB MEC module 1130 may be configured to host an IAB UPF having one or more application instances, to instantiate a remote PDCP layer and/or a remote SDAP layer for traffic for the application, and to route traffic from the wireless device 1102 through the remote PDCP layer and/or the remote SDAP layer to the IAB UPF according to QoS flows associated with the application instance on IAB UPF. As another example, for a network device 1116 that is an IAB donor, the IAB MEC module 1130 may receive, from a CN, instructions to instantiate a remote PDCP layer and/or a remote SDAP layer on one of its child IAB nodes that are configured for use with traffic of a MEC enabled application having an instance on IAB nodes, and accordingly cause the instantiation on the child IAB node. Further, the IAB MEC module 1130 may identify to the child IAB node one or more QoS flows that, when used by PDU session at the UE, should be routed by the child IAB node through the remote PDCP layer and/or the remote SDAP layer to the application instance on the IAB child node.

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 12:
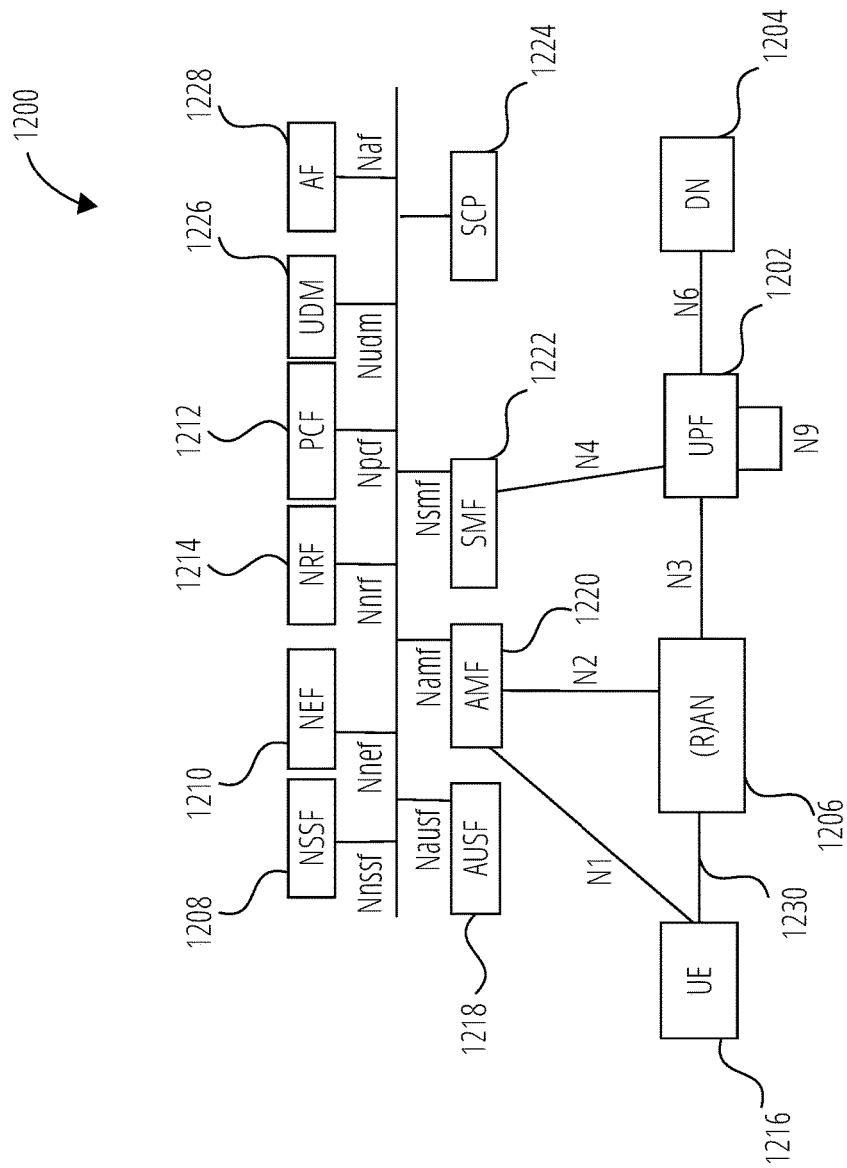
FIG. 12 illustrates an example service based architecture in accordance with certain embodiments.

FIG. 12 illustrates a service based architecture 1200 in 5GS according to one embodiment. As described in 3GPP TS 23.501, the service based architecture 1200 comprises NFs such as an NSSF 1208, a NEF 1210, an NRF 1214, a PCF 1212, a UDM 1226, an AUSF 1218, an AMF 1220, an SMF 1222, for communication with a UE 1216, a (R)AN 1206, a UPF 1202, and a DN 1204. The NFs and NF services can communicate directly, referred to as Direct Communication, or indirectly via a SCP 1224, referred to as Indirect Communication. FIG. 12 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 12 are described below.

The NSSF 1208 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 1210 supports exposure of capabilities and events. NF capabilities and events may be securely exposed by the NEF 1210 (e.g., for 3rd party, Application Functions, and/or Edge Computing). The NEF 1210 may store/retrieve information as structured data using a standardized interface (Nudr) to a UDR. The NEF 1210 may also secure provision of information from an external application to 3GPP network and may provide for the Application Functions to securely provide information to the 3GPP network (e.g., expected UE behavior, 5GLAN group information, and service specific information), wherein the NEF 1210 may authenticate and authorize and assist in throttling the Application Functions. The NEF 1210 may provide translation of internal-external information by translating between information exchanged with the AF 1228 and information exchanged with the internal network function. For example, the NEF 1210 translates between an AF-Service-Identifier and internal 5G Core information such as DNN and S-NSSAI. The NEF 1210 may handle masking of network and user sensitive information to external AF's according to the network policy. The NEF 1210 may receive information from other network functions (based on exposed capabilities of other network functions), and stores the received information as structured data using a standardized interface to a UDR. The stored information can be accessed and re-exposed by the NEF 1210 to other network functions and Application Functions, and used for other purposes such as analytics. For external exposure of services related to specific UE(s), the NEF 1210 may reside in the HPLMN. Depending on operator agreements, the NEF 1210 in the HPLMN may have interface(s) with NF(s) in the VPLMN. When a UE is capable of switching between EPC and an SCEF+NEF may be used for service exposure.

The NRF 1214 supports service discovery function by receiving an NF Discovery Request from an NF instance or SCP and providing the information of the discovered NF instances to the NF instance or SCP. The NRF 1214 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 1212 supports a unified policy framework to govern network behavior. The PCF 1212 provides policy rules to Control Plane function(s) to enforce them. The PCF 1212 accesses subscription information relevant for policy decisions in a Unified Data Repository (UDR). The PCF 1212 may access the UDR located in the same PLMN as the PCF.

The UDM 1226 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 1226 uses subscription data (including authentication data) that may be stored in a UDR, in which case a UDM implements the application logic and may not require an internal user data storage and several different UDMs may serve the same user in different transactions. The UDM 1226 may be located in the HPLMN of the subscribers it serves, and may access the information of the UDR located in the same PLMN.

The AUSF 1218 supports authentication for 3GPP access and untrusted non-3GPP access. The AUSF 1218 may also provide support for Network Slice-Specific Authentication and Authorization.

The AMF 1220 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 1220. Regardless of the number of Network functions, in certain embodiments there is only one NAS interface instance per access network between the UE and the CN, terminated at one of the Network functions that implements at least NAS security and Mobility Management. The AMF 1220 may also include policy related functionalities.

In addition to the functionalities described above, the AMF 1220 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a co-ordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 1222 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAB (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 1222 may include policy related functionalities.

The SCP 1224 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 1224 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 1216 may include a device with radio communication capabilities. For example, the UE 1216 may comprise a smartphone (e.g., handheld touchscreen mobile computing devices connectable to one or more cellular networks). The UE 1216 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 1216 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 1216 may be configured to connect or communicatively couple with the (R)AN 1206 through a radio interface 1230, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 1216 and the (R)AN 1206 may use a Uu interface (e.g., an LTE-Uu interface) to exchange control plane data via a protocol stack comprising a PHY layer, an MAC layer, an RLC layer, a PDCP layer, and an RRC layer. A DL transmission may be from the (R)AN 1206 to the UE 1216 and a UL transmission may be from the UE 1216 to the (R)AN 1206. The UE 1216 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 1206 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 1206 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 1206) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 1216 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 1202 may act as an anchor point for intra-RAT and inter-RAT mobility, an external PDU session point of interconnect to the DN 1204, and a branching point to support multi-homed PDU session. The UPF 1202 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 1202 may include an uplink classifier to support routing traffic flows to a data network. The DN 1204 may represent various network operator services, Internet access, or third party services. The DN 1204 may include, for example, an application server.

Certain embodiments disclosed herein may be implemented in a PDU Session Establishment procedure. A PDU Session establishment may correspond, for example, to one of a UE initiated PDU Session Establishment procedure, a UE initiated PDU Session handover between 3GPP and non-3GPP, a UE initiated PDU Session handover from EPS to 5G System (5GS), or a Network triggered PDU Session Establishment procedure.

Figure 13:
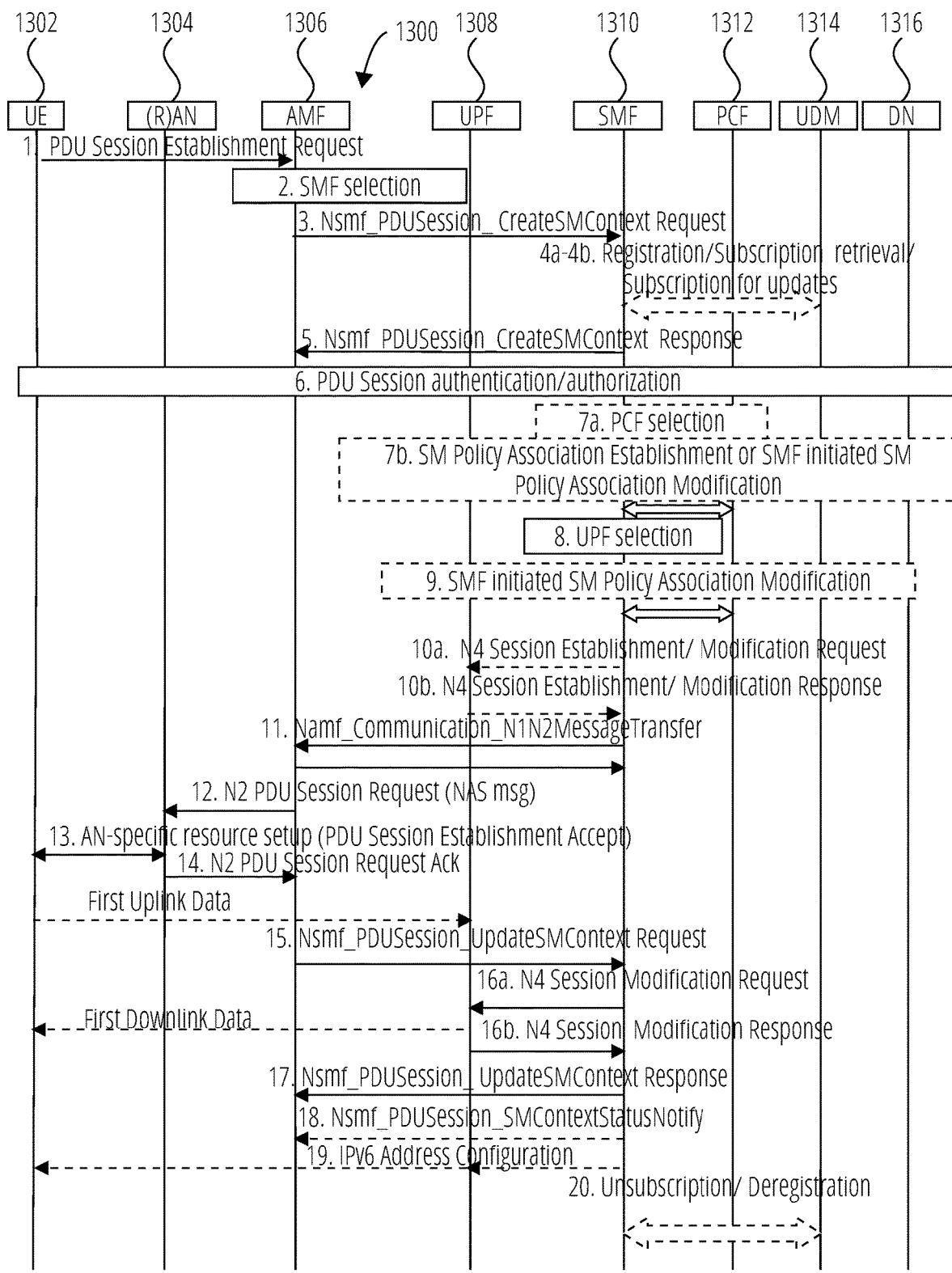
FIG. 13 illustrates a PDU session establishment procedure in accordance with one embodiment.

By way of example, FIG. 13 illustrates a UE requested PDU session establishment procedure 1300. The PDU session establishment procedure 1300 shown FIG. 13 includes messages between a UE 1302, a (radio) access network (shown as (R)AN 1304), an access and mobility management function (shown as AMF 1306), a user plane function (shown as UPF 1308), a session management function (shown as SMF 1310), a policy control function (shown as PCF 1312), a unified data management function (shown as UDM 1314), and a data network (shown as DN 1316). In this example, the call flow in TS 23.502 clause 4.3.2.2 (PDU Session Establishment) is used as a basis, and persons skilled in the art will understand that the description below only provides a summary and further details may be found in TS 23.502.

With reference to operation 1. of FIG. 13, from UE to AMF: NAS Message (single network slice selection identifier (S-NSSAI(s)), Data Network Name (DNN), PDU Session ID, Request type, Old PDU Session ID, N1 SM container (PDU Session Establishment Request)). In order to establish a new PDU Session, the UE generates a new PDU Session ID. The UE initiates the UE Requested PDU Session Establishment procedure by the transmission of a NAS message containing a PDU Session Establishment Request within the N1 SM container. The PDU Session Establishment Request includes a PDU session ID, Requested PDU SessionType, a Requested SSC mode, 5GSM Capability PCO, SM PDU DN Request Container, Number Of Packet Filters. The Request Type indicates "Initial request" if the PDU Session Establishment is a request to establish a new PDU Session and indicates "Existing PDU Session" if the request refers to an existing PDU Session switching between 3GPP access and non-3GPP access or to a PDU Session handover from an existing PDN connection in EPC. If the request refers to an existing PDN connection in EPC, the S-NSSAI is set as described in TS 23.501 clause 5.15.7.2.

The 5GSM Core Network Capability is provided by the UE and handled by SMF as defined in TS 23.501 [2] clause 5.4.4b. The 5GSM Capability also includes the UE Integrity Protection Maximum Data Rate. Additionally, the UE may indicate to the SMF in the 5GSM Capability IE of the PDU Session Establishment Request message that the UE supports the feature "flexible scope of packet filters for RQoS".

The Number Of Packet Filters indicates the number of supported packet filters for signaled QoS rules for the PDU Session that is being established. The number of packet filters indicated by the UE is valid for the lifetime of the PDU Session. For presence condition, see TS 24.501.

With reference to operation 2. of FIG. 13, the AMF determines that the message corresponds to a request for a new PDU Session based on that Request Type indicates "initial request" and that the PDU Session ID is not used for any existing PDU Session(s) of the UE. If the NAS message does not contain an S-NSSAI, the AMF determines a default S-NSSAI for the requested PDU Session either according to the UE subscription, if it contains only one default S-NSSAI, or based on operator policy. When the NAS Message contains an S-NSSAI but it does not contain a DNN, the AMF determines the DNN for the requested PDU Session by selecting the default DNN for this S-NSSAI if the default DNN is present in the UE's Subscription Information; otherwise the serving AMF selects a locally configured DNN for this S-NSSAI. If the DNN provided by the UE is not supported by the network and AMF cannot select an SMF by querying NRF, based on operator policy, the AMF shall reject the NAS Message containing PDU Session Establishment Request from the UE with an appropriate cause.

With reference to operation 3. of FIG. 13, from AMF to SMF: Either Nsmf_Request (Subscription Permanent Identifier (SUPI), DNN, S-NSSAI(s), PDU Session ID, AMF ID, Request Type, PCF ID, Priority Access, N1 SM container (PDU Session Establishment Request), User location information, Access Type, Permanent Equipment Identifier (PEI), Generic Public Subscription Identifier (GPSI), UE presence in Local Area Data Network (LADN) service area, Subscription For PDU Session Status Notification, DNN Selection Mode) or Nsmf_PDUSession_UpdateSMContext Request (SUPI, DNN, S-NSSAI(s), PDU Session ID, AMF ID, Request Type, N1 SM container (PDU Session Establishment Request), User location information, Access Type, RAT type, PEI). If the AMF does not have an association with an SMF for the PDU Session ID provided by the UE (e.g. when Request Type indicates "initial request"), the AMF invokes the Nsmf_PDUSession_CreateSMContext Request, but if the AMF already has an association with an SMF for the PDU Session ID provided by the UE (e.g. when Request Type indicates "existing PDU Session"), the AMF invokes the Nsmf_PDUSession_UpdateSMContext Request. The AMF sends the S-NSSAI from the Allowed NSSAI to the SMF. For roaming scenario, the AMF also sends the corresponding S-NSSAI from the Mapping Of Allowed NSSAI to the SMF. The AMF may include a PCF ID in the Nsmf_PDUSession_CreateSMContext Request. This PCF ID identifies the H-PCF in the non-roaming case and the V-PCF in the local breakout roaming case. In certain embodiments herein, the AMF may include the value of the 5GSM Capability IE of the PDU Session Establishment Request message that indicates that the UE supports the feature "flexible scope of packet filters for RQoS".

With reference to operations 4a-4b. of FIG. 13, the process includes Registration/Subscription retrieval/Subscription for updates.

With reference to operation 5. of FIG. 13, From SMF to AMF: Either Nsmf_PDUSession_CreateSMContext Response (Cause, SM Context ID or N1 SM container (PDU Session Reject(Cause))) or an Nsmf_PDUSession_UpdateSMContext Response depending on the request received in operation 3.

Operation 6. of FIG. 13 includes an optional PDU Session authentication/authorization.

Operations 7a. and 7b. of FIG. 13 include PCF selection and SM Policy Association Establishment or SMF initiated SM Policy Association Modification.

Operation 8. in FIG. 13 UPF selection.

Operation 9. in FIG. 13 includes SMF initiated SM Policy Association Modification.

Operations 10a. and 10b. in FIG. 13 includes N4 Session Establishment/Modification Request, and N4 Session Establishment/Modification Response.

With reference to operation 11. in FIG. 13, SMF to AMF: Namf_Communication_N1N2MessageTransfer (PDU Session ID, N2 SM information (PDU Session ID, QFI(s), QoS Profile(s), CN Tunnel Info, S-NSSAI from the Allowed NSSAI, Session-AMBR, PDU Session Type, User Plane SecurityEnforcement information, UE Integrity Protection Maximum Data Rate), N1 SM container (PDU Session Establishment Accept (QoS Rule(s) and QoS flow level QoS parameters if needed for the QoS flow(s) associated with the QoS rule(s), selected SSC mode, S-NSSAI(s), DNN, allocated IPv4 address, interface identifier, Session-AMBR, selected PDU Session Type, Reflective QoS Timer (if available), Reflective QoS rule scope, P-CSCF address(es)))). If multiple UPFs are used for the PDU Session, the CN Tunnel Info contain tunnel information related with the UPF that terminates N3. In certain embodiments herein, the Reflective QoS rule scope indicates the following: for PDU Session of IP typeit indicates to the UE whether the scope of RQoS includes both Source/Dest IP address pair and the Source/Dest Port number, or only the former; and for PDU Session of Ethernet typeit indicates to the UE whether the scope of RQoS includes both Source/Dest MAC address pair and the IEEE 802.1Q tag, or only the former.

The N2 SM information carries information that the AMF shall forward to the (R)AN which includes: the CN Tunnel Info corresponds to the Core Network address of the N3 tunnel corresponding to the PDU Session; one or multiple QoS profiles and the corresponding QFIs can be provided to the (R)AN. This is further described in TS 23.501 clause 5.7; PDU Session ID may be used by AN signaling with the UE to indicate to the UE the association between (R)AN resources and a PDU Session for the UE; a PDU Session is associated to an S-NSSAI and a DNN, wherein the S-NSSAI provided to the (R)AN, is the S-NSSAI with the value for the serving PLMN; User Plane SecurityEnforcement information is determined by the SMF as described in clause 5.10.3 of TS 23.501; and if the User Plane Security Enforcement information indicates that Integrity Protection is "Preferred" or "Required", the SMF also includes the UE Integrity Protection Maximum Data Rate as received in the 5GSM Capability.

The N1 SM container contains the PDU Session Establishment Accept that the AMF shall provide to the UE. If the UE requested P-CSCF discovery then the message shall also include the P-CSCF IP address(es) as determined by the SMF. The PDU Session Establishment Accept includes S-NSSAI from the Allowed NSSAI. For roaming scenario, the PDU Session Establishment Accept also includes corresponding S-NSSAI from the Mapping Of Allowed NSSAI that SMF received in operation 3. Multiple QoS Rules, QoS flow level QoS parameters if needed for the QoS flow(s) associated with those QoS rule(s) and QoS Profiles may be included in the PDU Session Establishment Accept within the N1 SM and in the N2 SM information. The Namf_Communication_N1N2MessageTransfer contains the PDU Session ID allowing the AMF to know which access towards the UE to use.

With reference to operation 12. in FIG. 13, AMF to (R)AN: N2 PDU Session Request (N2 SM information, NAS message (PDU Session ID, N1 SM container (PDU Session Establishment Accept))). The AMF sends the NAS message containing PDU Session ID and PDU Session Establishment Accept targeted to the UE and the N2 SM information received from the SMF within the N2 PDU Session Request to the (R)AN.

With reference to operation 13. in FIG. 13, (R)AN to UE: The (R)AN may issue AN specific signalling exchange with the UE that is related with the information received from SMF. For example, in case of a NG-RAN, an RRC Connection Reconfiguration may take place with the UE establishing the necessary NG-RAN resources related to the QoS Rules for the PDU Session request received in operation 12.

(R)AN also allocates (R)AN N3 tTunnel Infofor the PDU Session. In case of Dual Connectivity, the Master RAN node may assign some (zero or more) QFIs to be setup to a Master RAN node and others to the Secondary RAN node. The AN Tunnel Info includes a tunnel endpoint for each involved (R)AN node, and the QFIs assigned to each tunnel endpoint. A QFI can be assigned to either the Master RAN node or the Secondary RAN node and not to both.

(R)AN forwards the NAS message (PDU Session ID, N1 SM container (PDU Session Establishment Accept)) provided in step 12 to the UE. (R)AN shall only provide the NAS message to the UE if the necessary (R)AN resources are established and the allocation of (R)AN Tunnel Info are successful.

Operation 14. in FIG. 13 includes N2 PDU Session Request Ack.

After First Uplink Data, operation 15. in FIG. 13 includes AMF to SMF: Nsmf_PDUSession_UpdateSMContext Request (N2 SM information, Request Type).

With reference to operation 16a. in FIG. 13, the SMF initiates an N4 Session Modification procedure with the UPF. The SMF provides AN Tunnel Info to the UPF as well as the corresponding forwarding rules. Note that if the PDU Session Establishment Request was due to mobility between 3GPP and non-3GPP access or mobility from EPC, the downlink data path is switched towards the target access in this step. In certain embodiments herein, the SMF may inform the UPF that RQoS applies for the PDU Session for this PDU Session Establishment Request. When the SMF informs the UPF that RQoS applies for a certain PDU session, it also indicates whether for this specific PDU session the UPF shall apply the 'reduced' scope of packet filters for RQoS (i.e., whether for a PDU session of IP type just the Source/Dest IP address pair is used as packet filter, or for a PDU session of Ethernet type just the Source/Dest MAC address pair is used). For this indication, the SMF may take the support indication received from the UE into account. The UPF may use this information: to adapt the scope for the checking of UL packets; and to determine which DL packets need to be marked with an RQI.

With reference to operation 16b. in FIG. 13, the UPF provides an N4 Session Modification Response to the SMF. If multiple UPFs are used in the PDU Session, the UPF in step 16 refers to the UPF terminating N3. After this step, the UPF delivers any down-link packets (First Downlink Data) to the UE that may have been buffered for this PDU Session.

Operation 17. in FIG. 13 includes SMF to AMF: Nsmf_PDUSession_UpdateSMContext Response.

Operation 18. in FIG. 13 includes SMF to AMF: Nsmf_PDUSession_SMContextStatusNotify.

Operation 19. in FIG. 13 includes SMF to UE, via UPF: In case of PDU Session Type IPv6 or IPv4v6, the SMF generates an IPv6 Router Advertisement and sends it to the UE via N4 and the UPF.

Operation 20. in FIG. 13 includes, if the PDU Session establishment failed after step 4, the SMF performs Unsubscription or Deregistration.

In the above procedure according to certain embodiments, the embodiments may be reflected in the content of the PDU Session Establishment Accept message (see e.g., operations 11-13). At operation 11, the Namf_Communication_N1N2MessageTransfer operation is performed by the SMF to AMF. The Namf_Communication_N1N2MessageTransfer indicates or includes the Reflective QoS rule scope, as well as the PDU Session ID, N2 SM information (PDU Session ID, QFI(s), QoS Profile(s), CN Tunnel Info, S-NSSAI from the Allowed NSSAI, Session-AMBR, PDU Session Type, User Plane SecurityEnforcement information, UE Integrity Protection Maximum Data Rate), N1 SM container (PDU Session Establishment Accept (QoS Rule(s) and QoS Flow level QoS parameters if needed for the QoS Flow(s) associated with the QoS rule(s), selected SSC mode, S-NSSAI(s), DNN, allocated IPv4 address, interface identifier, Session-AMBR, selected PDU Session Type, Reflective QoS Timer (if available), P-CSCF address(es)))). If multiple UPFs are used for the PDU Session, the CN Tunnel Info contain tunnel information related with the UPF that terminates N3.

According to certain embodiments, for PDU Session of IP type the Reflective QoS rule scope indicates to the UE whether the scope of RQoS includes both Source/Dest IP address pair and the Source/Dest Port number, or only the former. For PDU Session of Ethernet type, the Reflective QoS rule scope indicates to the UE whether the scope of RQoS includes both Source/Dest MAC address pair and the IEEE 802.1Q tag, or only the former.

Additionally, in operations 1 and 3, the UE may indicate to the SMF in the PDU Session Establishment Request message (e.g., in the 5GSM Capability information element) that the UE supports the feature "flexible scope of packet filters for RQoS."

Furthermore, when the SMF informs the UPF that RQoS applies for a certain PDU session (see e.g., operation 16a), it also indicates whether for this specific PDU session the UPF is to apply the 'reduced' scope of packet filters for RQoS (e.g., whether for a PDU session of IP type just the Source/Dest IP address pair is used as packet filter or for a PDU session of Ethernet type just the Source/Dest MAC address pair is used). For this indication, the SMF may take the support indication received from the UE into account. In certain embodiments the UPF uses this information: to adapt the scope for the checking of UL packets; and/or to determine which DL packets need to be marked with an RQI.

With respect to the UPF adapting the scope for the checking of UL packets, the UPF is checking the UL packets sent by the UE to verify whether the UE is behaving in a compliant way, e.g., whether the is including the QFI applicable to the RQoS service data flow (SDF) only in those UL packets that are matching the respective packet filter(s). For this task, the UPF may need to know whether to perform the check based on the reduced scope or the full scope of the packet filter(s). If the UE is using the QFI for other packets, the UPF may discard the respective packets.

With respect to the UPF determining which DL packets need to be marked with an RQI, as described above, the SDFs occurring during a communication session between the UE and some servers in the network can be described either by a single packet filter of reduced scope (e.g., Source/Dest IP address pair only), or by several packet filters of the full scope (e.g., including Source/Dest IP address pair and Source/Dest Port numbers). For the full scope case, the UPF may need to ensure that for each of the different Source/Dest Port number pairs used during the communication session, the UPF marks one or more DL packets with the RQI so that the UE creates corresponding UL packet filters for each of these pairs. Whereas, for the reduced scope case, it may be sufficient for the UPF to mark one or more DL packets per Source/Dest IP address pair.

One example embodiment includes a method for controlling the derivation of QoS rules in the UE by flexibly defining the scope of packet header fields over which packet filter derivation is performed. In certain such embodiments, the scope of packet header fields for derivation of QoS rules is provided by the network to the UE upon PDU Session establishment or modification. For PDU Session of IP type, the network indicates to the UE whether the scope of RQoS includes both the Source/Dest IP address pair and the Source/Dest Port number, or only the former. For PDU Session of Ethernet type, the network indicates to the UE whether the scope of RQoS includes both the Source/Dest MAC address pair and the IEEE 802.1Q tag, or only the former. In certain embodiments, the UE indicates to the network whether it supports the flexible scope of packet filters for RQoS for a PDU session, whereby the network decides whether to use the flexible scope of packet filters for RQoS for a PDU session at least partly based on the receipt of the support indication from the UE.

Figure 14:
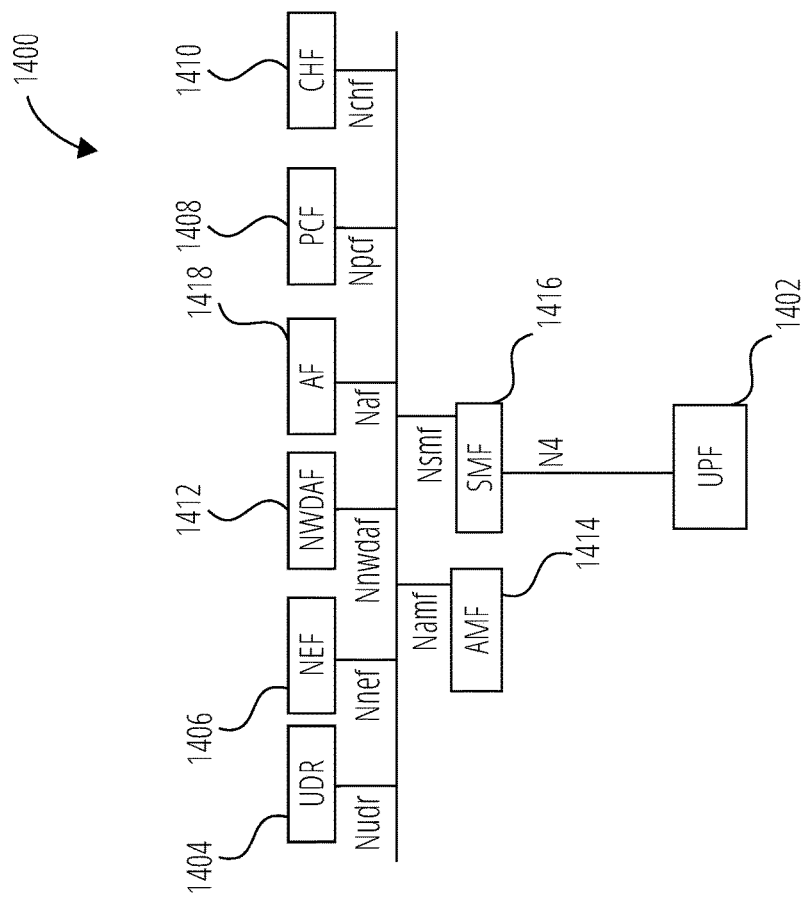
FIG. 14 illustrates a service based representation of an overall architecture for a policy and charging control framework in accordance with one embodiment.

FIG. 14 illustrates a service based representation 1400 of an overall architecture for a policy and charging control framework for a 5G system (5GS) according to one embodiment. As described in 3GPP TS 23.503, the service based representation 1400 comprises the functions of the Policy Control Function (shown as PCF 1408), the Session Management Function (shown as SMF 1416), the User Plane Function (shown as UPF 1402), the Access and Mobility Management Function (shown as AMF 1414), the Network Exposure Functionality (shown as NEF 1406), the Network Data Analytics Function (shown as NWDAF 1412), the Charging Function (shown as CHF 1410), the Application Function (shown as AF 1418) and a Unified Data Repository (shown as UDR 1404). FIG. 14 also shows the corresponding interfaces including Nudr, Nnef, Nnwdaf, Naf, Npcf, Nchf, Namf, and Nsmf. An N4 reference point may not be part of the 5G policy framework, but is shown for completeness.

Figure 15:
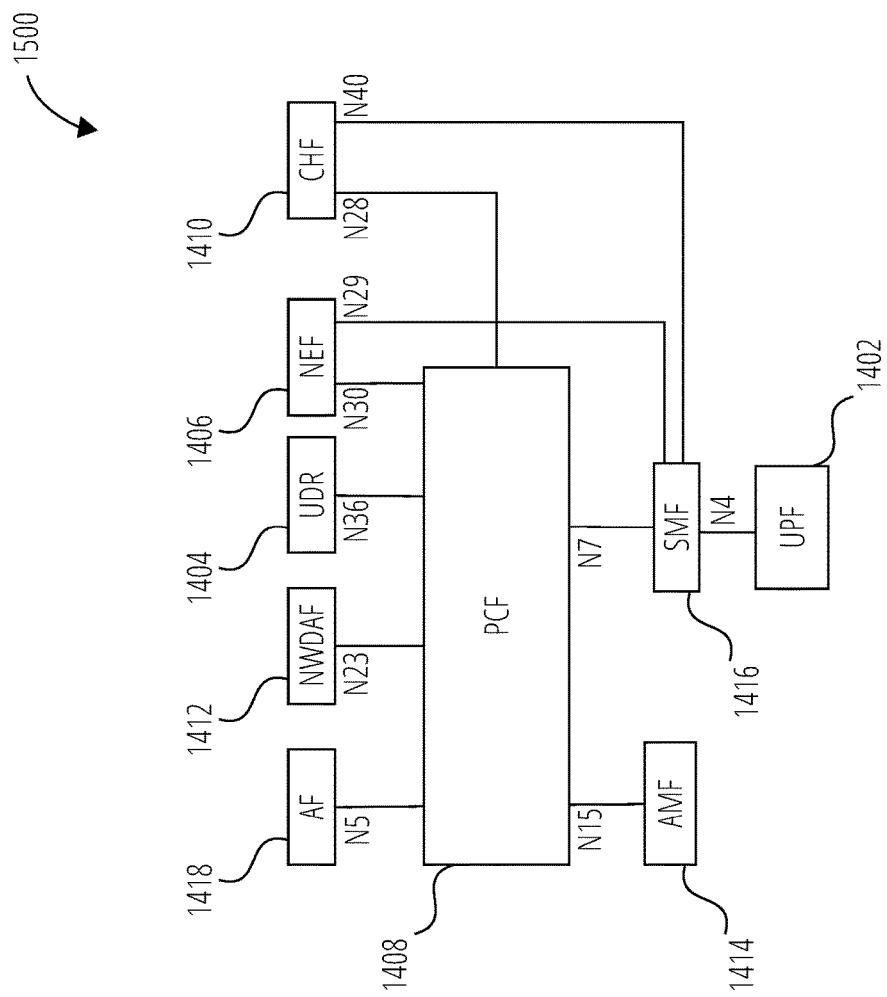
FIG. 15 illustrates a reference point representation of an overall architecture for a policy and charging control framework in accordance with one embodiment.

FIG. 15 illustrates a reference point representation 1500 of an overall architecture for a policy and charging control framework for 5GS according to one embodiment. As described in 3GPP TS 23.503, the reference point representation 1500 comprises the functions of the PCF 1408, the SMF 1416, the UPF 1402, the AMF 1414, the NEF 1406, the as NWDAF 1412, the CHF 1410, the AF 1418 and the UDR 1404. FIG. 15 also shows the corresponding reference points N5, N23, N36, N30, N29, N28, N40, N15, N7, and N4. The N4 reference point may not be part of the 5G policy framework, but is shown for completeness.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of an integrated access and backhaul (IAB) node for providing multi-access edge computing (MEC), comprising:
   instantiating an IAB user plane function (UPF) at the IAB node;
   providing, to a core network (CN), an indication that the IAB node is capable of operating the IAB UPF and a remote packet data convergence protocol (PDCP) layer for an IAB donor; and
   instantiating, according to instructions received from the IAB donor, the remote PDCP layer at the IAB node, wherein the instructions comprise an identifier for a quality of service (QOS) flow, and wherein the remote PDCP layer is configured to route the QoS flow to the IAB UPF.

2. The method of claim 1, further comprising:
   routing the QoS flow to the IAB UPF via the remote PDCP layer.

3. The method of claim 2, further comprising:
   instantiating a remote service data adaptation protocol (SDAP) layer at the IAB node according to the instructions received from the IAB donor, wherein the remote SDAP layer is configured to route the QoS flow to the IAB UPF; and
   routing the QoS flow to the IAB UPF via the remote SDAP layer.

4. The method of claim 2, wherein a DRB for the QoS flow is established with a UE connected to the IAB node.

5. The method of claim 1, further comprising:
   registering a network function (NF) profile for the IAB UPF with a network repository function (NRF) of the CN, the NF profile comprising an IP address corresponding to a protocol data unit (PDU) session between the IAB node and the CN and an identifier for the IAB node.

6. The method of claim 1, further comprising:
   performing N4 establishment for the IAB UPF with the CN.

7. The method of claim 1, further comprising:
sending, to the CN, a data network access identifier (DNAI) for the IAB UPF and an identification of an application associated with the IAB UPF.

8. The method of claim 1, further comprising:
receiving a data network access identifier (DNAI) for the IAB UPF.

9. The method of claim 1, further comprising:
receiving credentials for accessing a network repository function (NRF) of the CN.

10. A method of a core network (CN) for operating with an integrated access and backhaul (IAB) node configured to provide multi-access edge computing (MEC), comprising:
receiving, from the IAB node, a first indication that the IAB node is capable of operating an IAB user plane function (UPF) and a remote packet data convergence protocol (PDCP) layer for an IAB donor;
receiving, from the IAB node, a network function (NF) profile for the IAB UPF comprising an identifier for the IAB node;
determining, for a user equipment (UE), user location information comprising the identifier for the IAB node;
determining that traffic of the UE is for the IAB UPF based on a policy and charging control (PCC) rule associated with a PDU session between the CN and the UE and a determination that each of the NF profile for the IAB UPF and the user location information for the UE includes the identifier for the IAB node;
identifying a quality of service (QOS) flow for the traffic;
sending, to the IAB donor, a second indication that the QoS flow is to be routed to the IAB UPF; and
sending, to the UE, instructions to assign the traffic to the QoS flow.

11. The method of claim 10, wherein the indication that the QoS flow is to be routed to the IAB UPF comprises an identifier for the QoS flow and the identifier for the IAB node.

12. The method of claim 10, wherein the user location information is determined during establishment of a PDU session between the CN and the UE.

13. The method of claim 10, wherein the NF profile for the IAB UPF further comprises an IP address corresponding to a PDU session between the IAB node and the CN.

14. The method of claim 13, further comprising:
performing N4 establishment for the IAB UPF with the IAB node based on the IP address corresponding to the PDU session between the IAB node and the CN.

15. The method of claim 10, further comprising:
receiving, from the IAB node, a data network access identifier (DNAI) for the IAB node and an identification of an application associated with the IAB UPF; and
generating the PCC rule based on the DNAI and the identification of the application associated with the IAB UPF.

16. The method of claim 10, wherein a network repository function (NRF) of the CN informs a session management function (SMF) of the CN of the NF profile for the IAB UPF.

17. The method of claim 10, wherein a determination that the PCC rule applies to the traffic is made by a UPF of the CN.

18. The method of claim 10, wherein the determination that each of the NF profile for the IAB UPF and the user location information from the UE includes the identifier for the IAB node is made by a session management function (SMF) of the CN.

19. A method of an integrated access and backhaul (IAB) donor for operating with an IAB node configured to provide multi-access edge computing (MEC), comprising:
receiving, from a core network (CN), an indication that a quality of service (QOS) flow is to be routed to an IAB user plane function (UPF) of the IAB node; and
sending, to the IAB node, first instructions to instantiate a remote packet data convergence protocol (PDCP) layer for the IAB donor at the IAB node, wherein the remote PDCP layer is configured to route the QoS flow to the IAB UPF.

20. The method of claim 19, further comprising:
sending, to the IAB node, second instructions to instantiate a remote service data adaptation protocol (SDAP) layer for the IAB donor, wherein the remote SDAP layer is configured to route the QoS flow to the IAB UPF.

* * * * *